(12) United States Patent
   Inuzuka

(10) Patent No.: US 12,683,444 B2
(45) Date of Patent: Jul. 14, 2026

(54) ELECTRIC WORK MACHINE

(71) Applicant: MAKITA CORPORATION, Anjo (JP)

(72) Inventor: Junya Inuzuka, Anjo (JP)

(73) Assignee: MAKITA CORPORATION, Anjo (JP)

( * ) Notice: Subject to any disclaimer, the term of this patent is extended or adjusted under 35 U.S.C. 154(b) by 943 days.

(21) Appl. No.: 17/804,622

(22) Filed: May 31, 2022

(65) Prior Publication Data

US 2023/0010726 A1     Jan. 12, 2023

(30) Foreign Application Priority Data

Jul. 9, 2021   (JP) .................................. 2021-114139

(51) Int. Cl.
| | |
|---|---|
| *H02K 1/27* | (2022.01) |
| *H02K 1/278* | (2022.01) |
| *H02K 1/28* | (2006.01) |
| *H02K 3/34* | (2006.01) |
| *H02K 7/14* | (2006.01) |

(Continued)

(52) U.S. Cl.
CPC .............. *H02K 1/278* (2013.01); *H02K 1/28* (2013.01); *H02K 3/34* (2013.01); *H02K 7/14* (2013.01); *H02K 11/21* (2016.01); *H02K 21/12* (2013.01)

(58) Field of Classification Search
CPC .......... H02K 1/278; H02K 11/21; H02K 1/28; H02K 3/34; H02K 7/14; H02K 21/12
See application file for complete search history.

(56) References Cited

U.S. PATENT DOCUMENTS

| | | | | |
|---|---|---|---|---|
| 2003/0236601 A1* | 12/2003 | McLeod | ................. | B60L 53/64 |
| | | | | 701/31.4 |
| 2016/0141932 A1 | 5/2016 | Aoyama et al. | | |

(Continued)

FOREIGN PATENT DOCUMENTS

| | | | | |
|---|---|---|---|---|
| CN | 106208437 | * | 7/2018 | ........... H02K 1/2786 |
| CN | 209217852 U | | 8/2019 | |
| JP | 2000134893 A | | 5/2000 | |

(Continued)

OTHER PUBLICATIONS

Office Action from the Japanese Patent Office dispatched Nov. 5, 2024, in related Japanese application No. 2021-114139, and translation thereof.

*Primary Examiner* — Terrance L Kenerly

(74) *Attorney, Agent, or Firm* — J-TEK LAW PLLC; Jeffrey D. Tekanic; Scott T. Wakeman

(57) ABSTRACT

An electric work machine includes: a brushless motor including: a rotor having permanent magnets fixed to a rotor core; a stator core; one or more insulators fixed to the stator core; and a stator including coils mounted on the insulator (s); magnetic sensors, which detect the position of the rotor in a rotational direction by detecting the magnetic flux of the permanent magnets; a controller, which controls energization of the coils based in part on detection signals of the magnetic sensors; and an output part driven by the rotor. The permanent magnets are each a neodymium, sintered, plate magnet. The pole count (N) is the number of permanent magnets. The stator diameter (x) is the diameter of a surface of the stator core that faces the rotor in millimeters. The following condition is satisfied: $0.16x+2.5<N<0.23x+3.6$.

20 Claims, 19 Drawing Sheets

(51) Int. Cl.
   *H02K 11/21*       (2016.01)
   *H02K 21/12*       (2006.01)

(56)             References Cited

U.S. PATENT DOCUMENTS

| | | | |
|---|---|---|---|
| 2018/0062471 A1 | 3/2018 | Shiraki et al. | |
| 2019/0348877 A1* | 11/2019 | Kouda .................. | H02K 1/276 |

FOREIGN PATENT DOCUMENTS

| | | | | |
|---|---|---|---|---|
| JP | 2006197786 A | 7/2006 | | |
| JP | 2007259513 A | 10/2007 | | |
| JP | 2009136076 A | 6/2009 | | |
| JP | 2012010589 | * 1/2012 | .............. | H02K 1/27 |
| JP | 2012175752 | * 9/2012 | ............ | H02K 21/16 |
| JP | 2012175752 A | 9/2012 | | |
| JP | 2013128341 A | 6/2013 | | |
| JP | 2015130724 A | 7/2015 | | |
| JP | 2016093132 A | 5/2016 | | |
| JP | 2016111738 A | 6/2016 | | |
| JP | 2019198158 A | 11/2019 | | |
| JP | 2020022326 A | 2/2020 | | |
| WO | 2017130580 A1 | 8/2017 | | |

* cited by examiner

RIGHT

FRONT ← → REAR

LEFT

| | WORKING EXAMPLE K | COM-PARATIVE EXAMPLE M1 | COM-PARATIVE EXAMPLE M2 | COM-PARATIVE EXAMPLE M3 | COM-PARATIVE EXAMPLE M4 | COM-PARATIVE EXAMPLE M5 | COM-PARATIVE EXAMPLE M6 | COM-PARATIVE EXAMPLE M7 | COM-PARATIVE EXAMPLE M8 | COM-PARATIVE EXAMPLE M9 |
|---|---|---|---|---|---|---|---|---|---|---|
| STATOR OUTER DIAMETER [mm] | 117.3 | 117.3 | 44 | 52 | 80 | 122 | 99 | 99 | 51 | 113 |
| POLE COUNT | 28 | 20 | 4 | 4 | 8 | 8 | 8 | 8 | 6 | 10 |
| SLOT COUNT | 24 | 18 | 6 | 6 | 12 | 12 | 12 | 12 | 9 | 12 |
| ROTOR | OUTER | OUTER | INNER | INNER | INNER | INNER | INNER | INNER | OUTER | OUTER |
| STATOR INNER DIAMETER [mm] | - | - | 21 | 27 | 53 | 69 | 53.5 | 52 | - | - |

ELECTRIC WORK MACHINE

CROSS-REFERENCE

This application claims priority to Japanese Patent Application No. 2021-114139 filed on Jul. 9, 2021, the contents of which are incorporated herein by reference.

TECHNICAL FIELD

Techniques disclosed in the present specification relate to an electric work machine.

BACKGROUND ART

A known electric work machine related to the present teachings is disclosed in US 2016/0141932.

SUMMARY

In electric work machines in which a brushless motor is used as the power source, it is desired to make the brushless motor more lightweight and compact while maintaining a stipulated output power.

It is one non-limiting object of the present teachings to disclose techniques for making a brushless motor, which is used as the power source of an electric work machine, more lightweight and compact.

In one non-limiting aspect of the present teachings, an electric work machine may comprise: a brushless motor comprising a rotor and a stator; magnetic sensors; a controller; and an output part, which is driven by the rotor. The rotor may comprise a rotor core and permanent magnets, which are fixed to the rotor core. The stator may comprise a stator core; an insulator or insulators, which is (are) fixed to the stator core; and coils, which are mounted on the insulator(s). The magnetic sensors may detect the position of the rotor in a rotational direction by detecting the magnetic flux of the permanent magnets. The controller may control the coils that are energized in accordance with detection signals of the magnetic sensors. The permanent magnets may each be a neodymium, sintered, plate magnet. When the pole count, which denotes the number of permanent magnets, is given as N and the stator diameter, which denotes the diameter of the stator core at a surface of the stator core that faces the rotor, is given as x [mm], the following condition may be satisfied:

$$0.16x+2.5<N<0.23x+3.6.$$

According to the techniques disclosed in the present specification, a brushless motor, which is used as the power source of an electric work machine, can be made more lightweight and compact without reducing output power generated by the motor.

BRIEF DESCRIPTION OF THE DRAWINGS

FIG. 14 is a schematic drawing of electric circuits of the electric work machine according to the embodiment.

FIG. 15 is a drawing for explaining motors according to a working example and comparative examples.

DETAILED DESCRIPTION OF THE INVENTION

Figure 1:
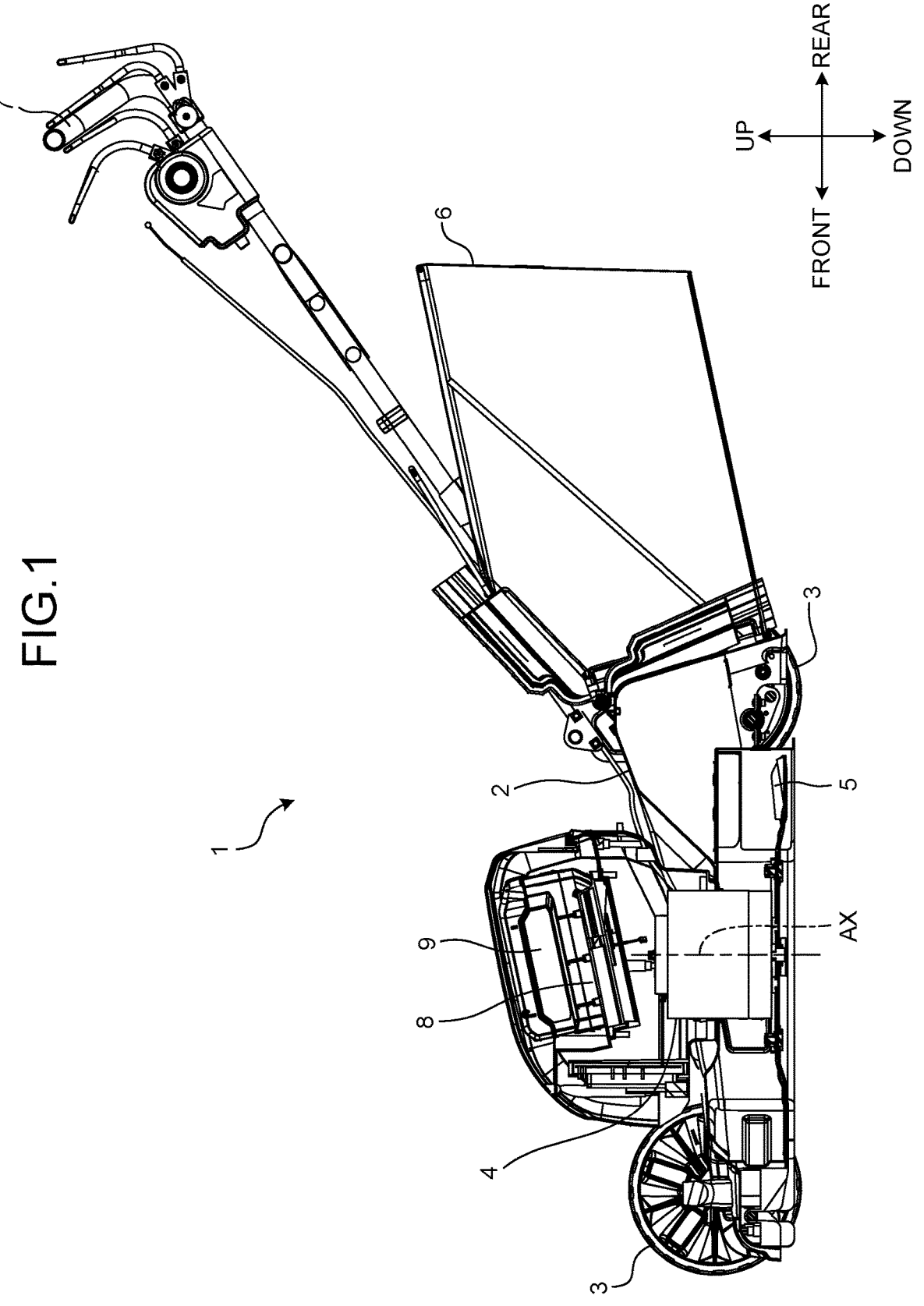
FIG. 1 shows an electric work machine according to one representative, non-limiting embodiment of the present teachings.

In one or more embodiments of the present teachings, an electric work machine may comprise: a brushless motor comprising a rotor and a stator; magnetic sensors; a controller; and an output part, which is driven by the rotor. The rotor may comprise a rotor core and permanent magnets, which are fixed to the rotor core. The stator may comprise a stator core; one or more insulators, which is (are) fixed to the stator core; and coils, which are mounted on the insulator(s). The magnetic sensors may detect the position of the rotor in a rotational direction by detecting the magnetic flux of the permanent magnets. The controller may control the coils that are energized in accordance with detection signals of the magnetic sensors. The permanent magnets may each be a neodymium, sintered, plate magnet. When the pole count, which denotes the number of permanent magnets, is given as N and the stator diameter, which denotes the diameter of the stator core at a facing surface of the stator core that faces the rotor, is given as x [mm], the following condition may be satisfied:

$$0.16x+2.5<N<0.23x+3.6.$$

With regard to the above-mentioned configuration, by satisfying the condition of [$0.16x+2.5<N$], the brushless motor can be made more lightweight and compact. By satisfying the condition of [$N<0.23x+3.6$], a decrease in the detection accuracy of the magnetic sensors can be avoided.

In one or more embodiments of the present teachings, the electric work machine may comprise one or more battery-mounting parts. One or more battery packs, which output(s) electric power supplied to the coils, may be mounted on the battery-mounting part(s). The brushless motor may be a three-phase motor. When the wire-to-wire resistance of the coil(s) is given as R [mΩ] and the rated voltage of the battery pack(s) is given as V [V], the following condition may be satisfied:

$$R/V^2 \leq 0.038.$$

With regard to the above-mentioned configuration, even if the electric power is continuously input to the brushless motor, the likelihood of burnout of the coils can be reduced. Accordingly, the electric work machine can more durably exhibit the desired performance.

In one or more embodiments of the present teachings, an electric work machine may comprise: a brushless motor, which comprises a rotor and stator; and an output part, which is driven by the rotor. The rotor may comprise a rotor core and permanent magnets, which are fixed to the rotor core. The stator may comprise: a stator core; one or more insulators, which is (are) fixed to the stator core; and coils, which are mounted on the insulator(s). The pole count, which denotes the number of permanent magnets, may be 28. The slot count, which denotes the number of coils, may be 24.

With regard to the above-mentioned configuration, because the pole count is 28 and the slot count is 24, the magnetic fluxes generated by the coils are dispersed, and thereby the permanent magnets can be made more compact and thin. Thereby, the brushless motor can be made more lightweight and compact.

In one or more embodiments, the brushless motor may be an outer-rotor type.

With regard to the above-mentioned configuration, high motor torque is obtained.

In one or more embodiments: the brushless motor may be an outer-rotor type; and the rotor outer diameter may be 105 mm or more and 125 mm or less. The rotor outer diameter may be 110 mm or more and 120 mm or less.

With regard to the above-mentioned configuration, the brushless motor can be made more lightweight and compact.

In one or more embodiments, the stator core may comprise teeth, around which the coils are respectively wound with the insulator(s) interposed therebetween. The tooth width may be 4 mm or more and 8 mm or less.

With regard to the above-mentioned configuration, the brushless motor can be made more lightweight and compact.

In one or more embodiments, the magnet thickness, i.e. the thickness of the permanent magnets, may be 1.5 mm or more and 3.5 mm or less.

With regard to the above-mentioned configuration, the brushless motor can be made more lightweight and compact.

In one or more embodiments, the permanent magnets may be fixed to an inner-circumferential surface of the rotor core.

With regard to the above-mentioned configuration, the brushless motor can be made more compact.

In one or more embodiments, the permanent magnets may be fixed to the rotor core by a bonding agent.

With regard to the above-mentioned configuration, the permanent magnets are fixed to the rotor core using a simple composition.

In one or more embodiments, the electric work machine may comprise a rotor shaft, which is fixed to the rotor. The output part may be fixed to the rotor shaft.

In the above-mentioned configuration, the output part is driven by a motor in a direct-drive mode.

Embodiments according to the present disclosure will be explained below, with reference to the drawings, but the present invention is not limited to the embodiments. Structural elements of the embodiment explained below can be combined where appropriate. In addition, there are also embodiments in which some of the structural elements need not be used.

In the embodiments described below, positional relationships among the various parts are explained using the terms "left," "right," "front," "rear," "up," and "down." These terms indicate relative position or direction, with the center of the electric work machine as a reference.

The electric work machine comprises the motor. In the embodiment, a radial direction of rotational axis AX of the motor is called the radial direction where appropriate. A direction parallel to rotational axis AX of the motor is called the axial direction where appropriate. A direction that goes around rotational axis AX of the motor is called the circumferential direction or the rotational direction where appropriate.

A location that is proximate to or a direction that approaches rotational axis AX of the motor in the radial direction is called radially inward where appropriate. A location that is distant from or a direction that leads away from rotational axis AX of the motor in the radial direction is called radially outward where appropriate.

A location on one side or a direction on one side of the axial direction is called one side in the axial direction where appropriate. A location on the other side or a direction on the other side of the axial direction is called the other side in the axial direction where appropriate. In the embodiment, the axial direction is an up-down direction. When the one side in the axial direction is regarded as the upward side, the other side in the axial direction is the downward side. On the other hand, when the one side in the axial direction is regarded as the downward side, the other side in the axial direction is the upward side.

The location on one side or the direction on one side of the circumferential direction is called one side in the circumferential direction where appropriate, and a location on the other side or a direction on the other side of the circumferential direction is called the other side in the circumferential direction where appropriate.

Electric Work Machine

FIG. 1 shows an electric work machine 1 according to one non-limiting embodiment of the present teachings. In the embodiment described in detail below, the electric work machine 1 is a lawn mower, which is one type of gardening tool (outdoor power equipment).

As shown in FIG. 1, the electric work machine 1 comprises a housing 2, wheels 3, a motor 4, a cutting blade 5, a grass-catcher box 6, a handle 7, and a battery-mounting part 8.

The housing 2 houses the motor 4 and the cutting blade 5. The wheels 3, the motor 4, and the cutting blade 5 are each supported in the housing 2.

The wheels 3 are rotatable while being in contact with the ground. When the wheels 3 rotate, the electric work machine 1 can move across the ground. Four of the wheels 3 are provided.

The motor 4 is the power source (prime mover) of the electric work machine 1. The motor 4 generates a rotational force, which causes the cutting blade 5 to rotate. The motor 4 is disposed upward of the cutting blade 5.

The cutting blade 5 is coupled to the motor 4. The cutting blade 5 is the output part of the electric work machine 1 driven by the motor 4. When the motor 4 generates a rotational force, the cutting blade 5 rotates about rotational axis AX of the motor 4. The cutting blade 5 faces the ground. In the state in which the wheels 3 are in contact with the ground, rotation of the cutting blade 5 causes the grass growing on the ground to be cut. The grass cut by the cutting blade 5 is received (caught) in the grass-catcher box (bag) 6.

The handle 7 is configured to be gripped by the hands of the user of the electric work machine 1. When the user has gripped the handle 7, the user can move the electric work machine 1.

A battery pack 9 is mounted on the battery-mounting part 8. The battery pack 9 is the electrical power supply of the electric work machine 1. The battery pack 9 is detachable from the battery-mounting part 8. The battery pack 9 comprises secondary (rechargeable) batteries. In the present embodiment, the battery pack 9 comprises rechargeable lithium-ion batteries. When mounted on the battery-mounting part 8, the battery pack 9 can supply electric power to the electric work machine 1. In other words, the battery pack 9 outputs electric power, which is supplied to the motor 4. The motor 4 is driven by drive currents, which are supplied from the battery pack 9.

Motor

Figure 2:
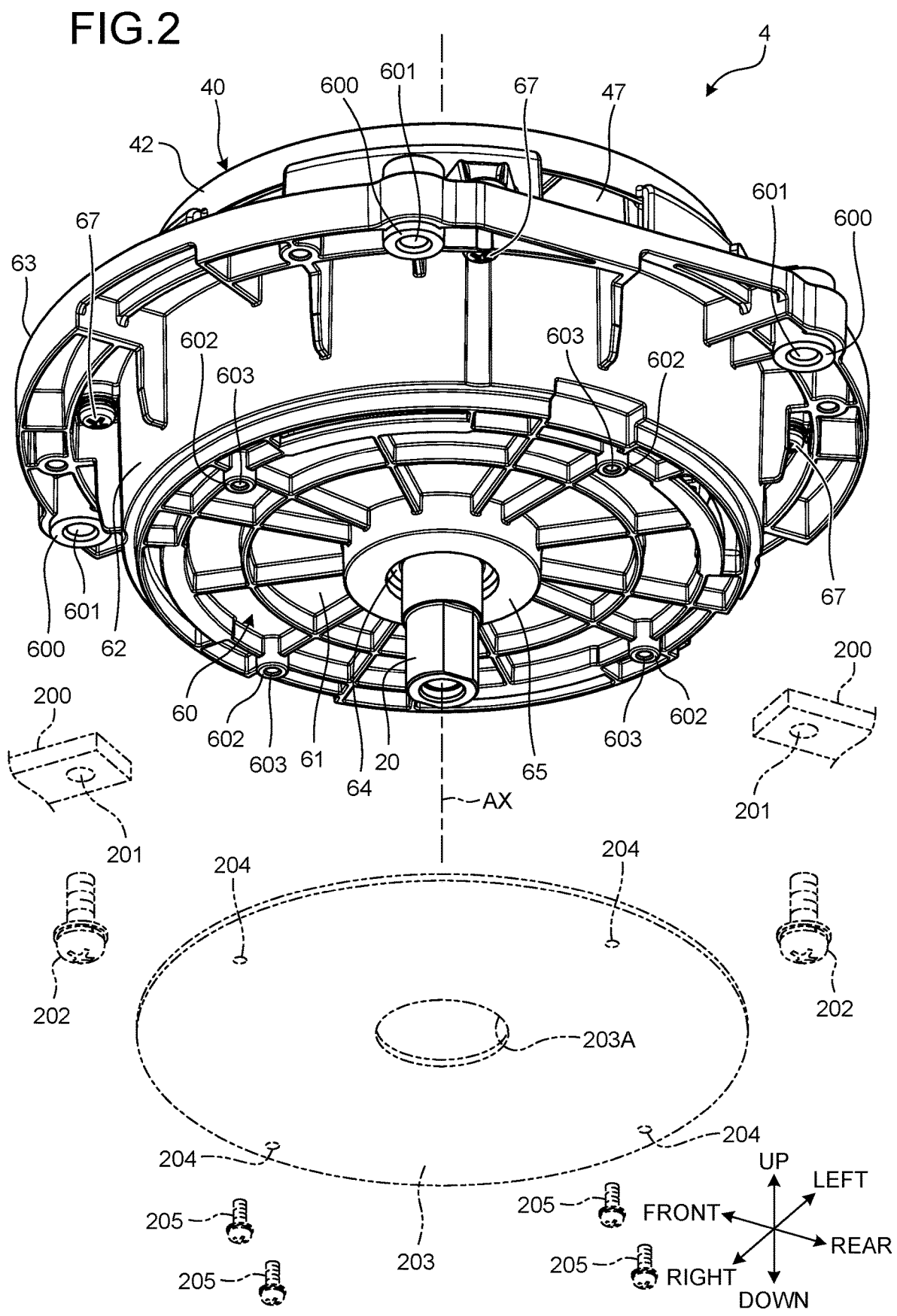
FIG. 2 is an oblique view, viewed from below, that shows a motor according to the embodiment.
Figure 3:
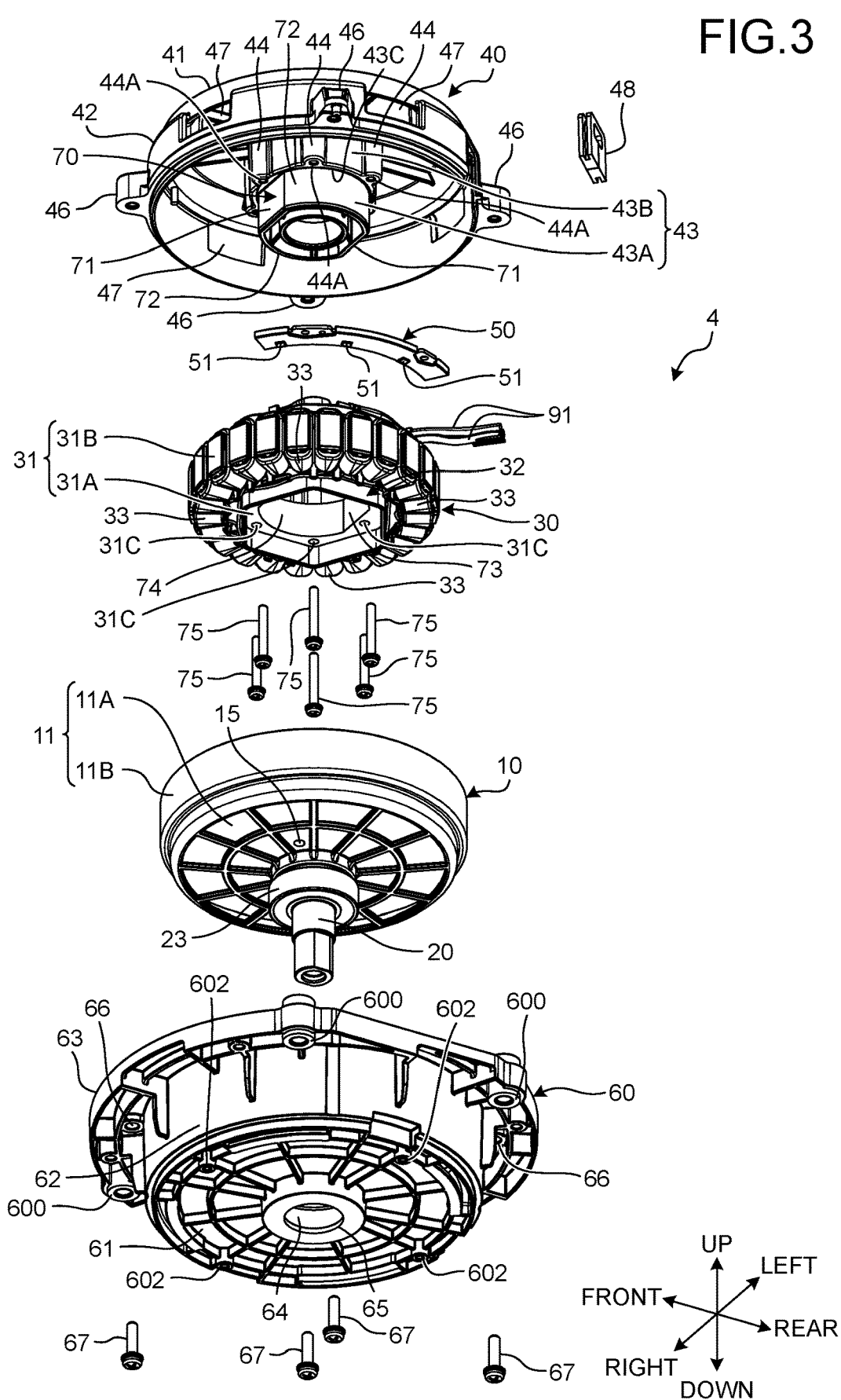
FIG. 3 is an exploded, oblique view, viewed from below, that shows the motor according to the embodiment.
Figure 4:
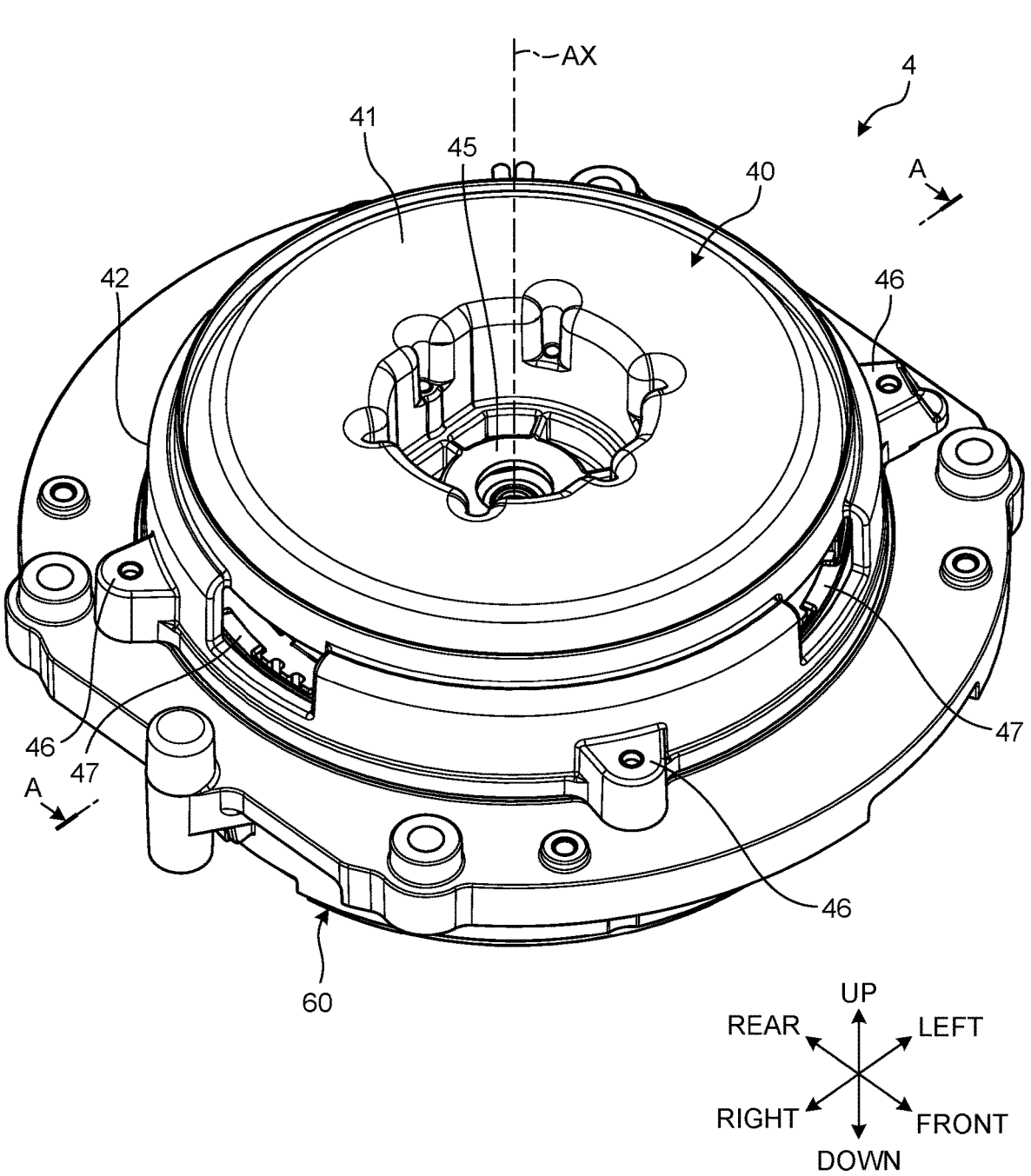
FIG. 4 is an oblique view, viewed from above, that shows the motor according to the embodiment.
Figure 5:
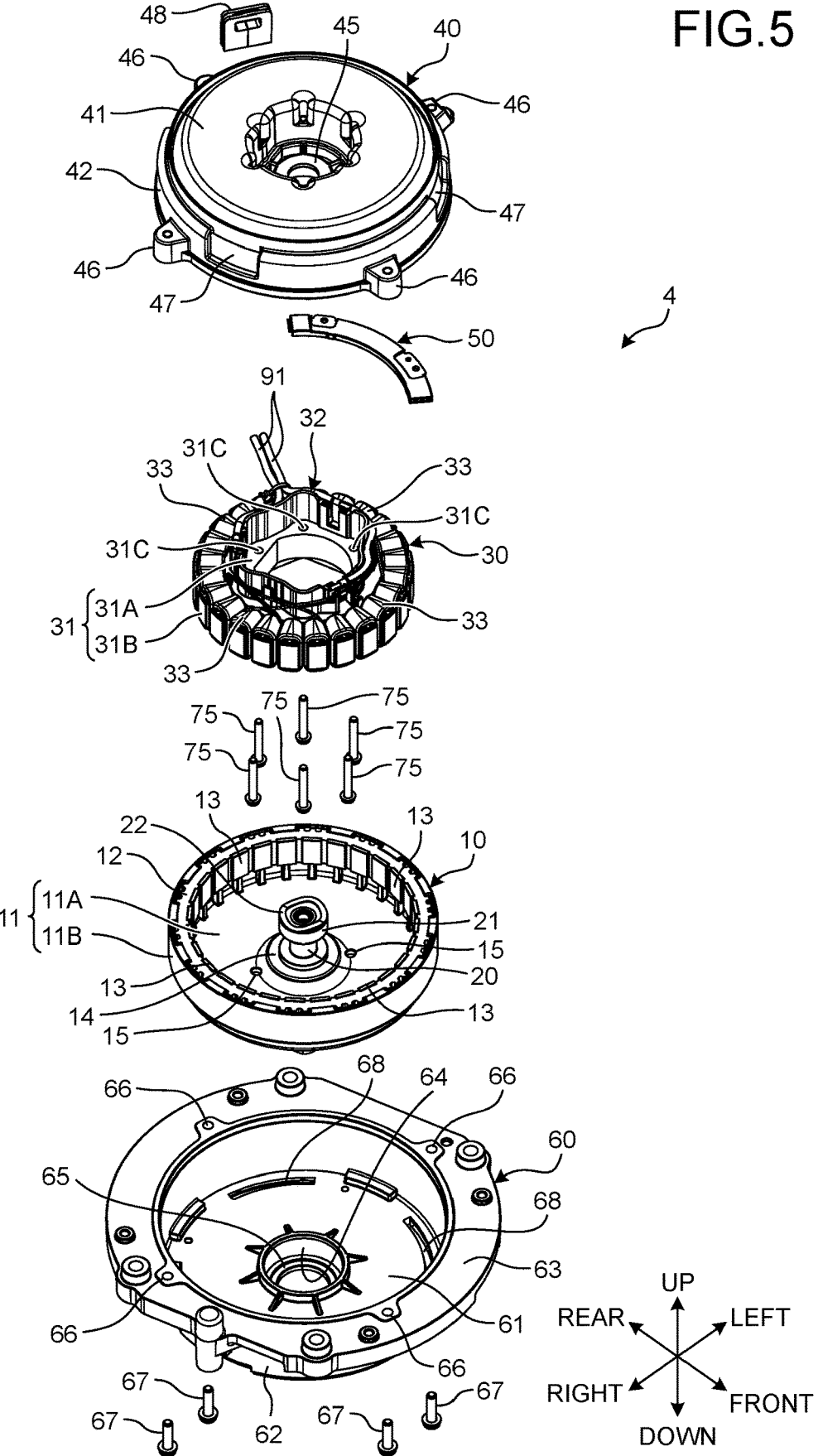
FIG. 5 is an exploded, oblique view, viewed from above, that shows the motor according to the embodiment.
Figure 6:
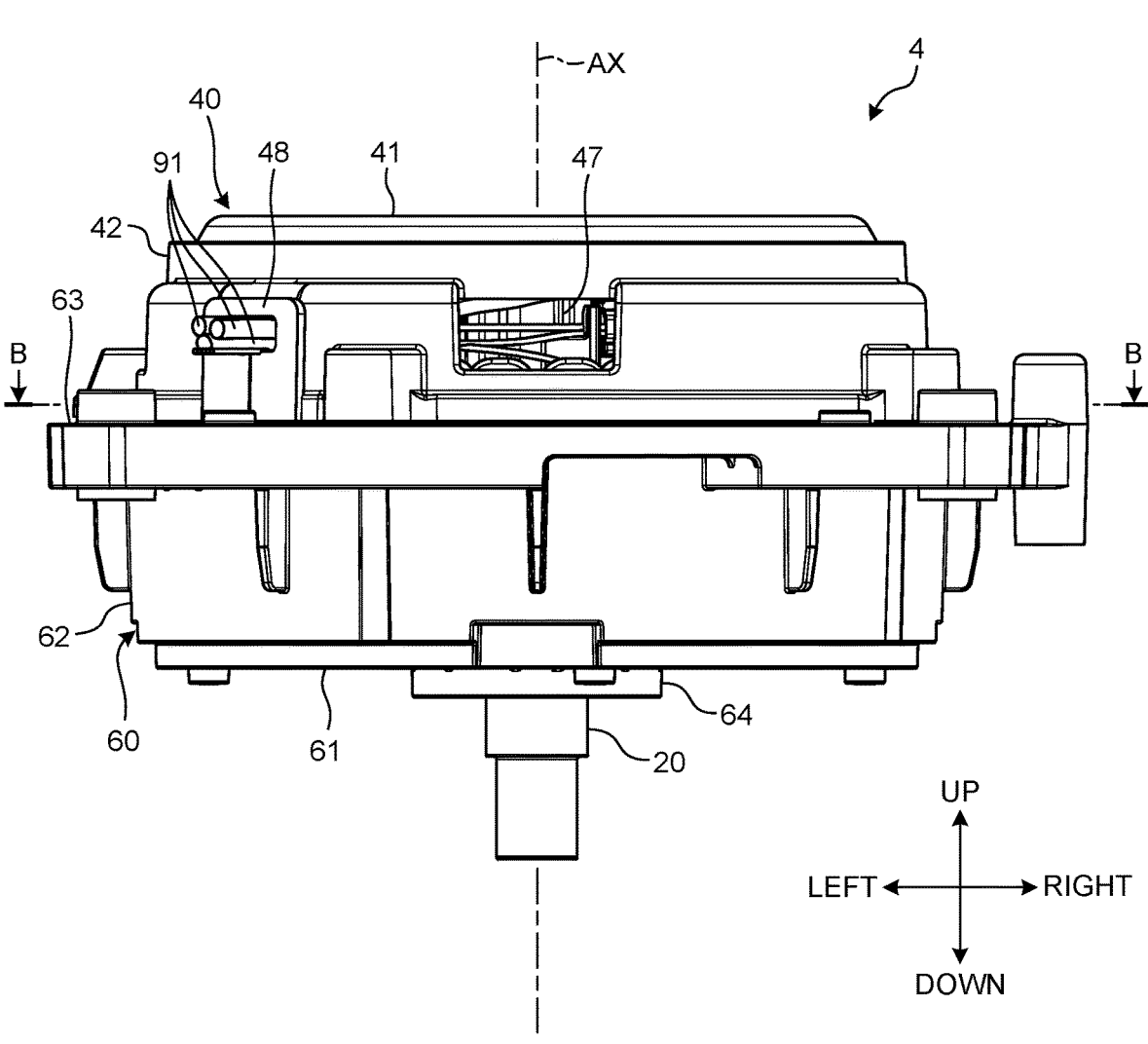
FIG. 6 is a front view that shows the motor according to the embodiment.
Figure 7:
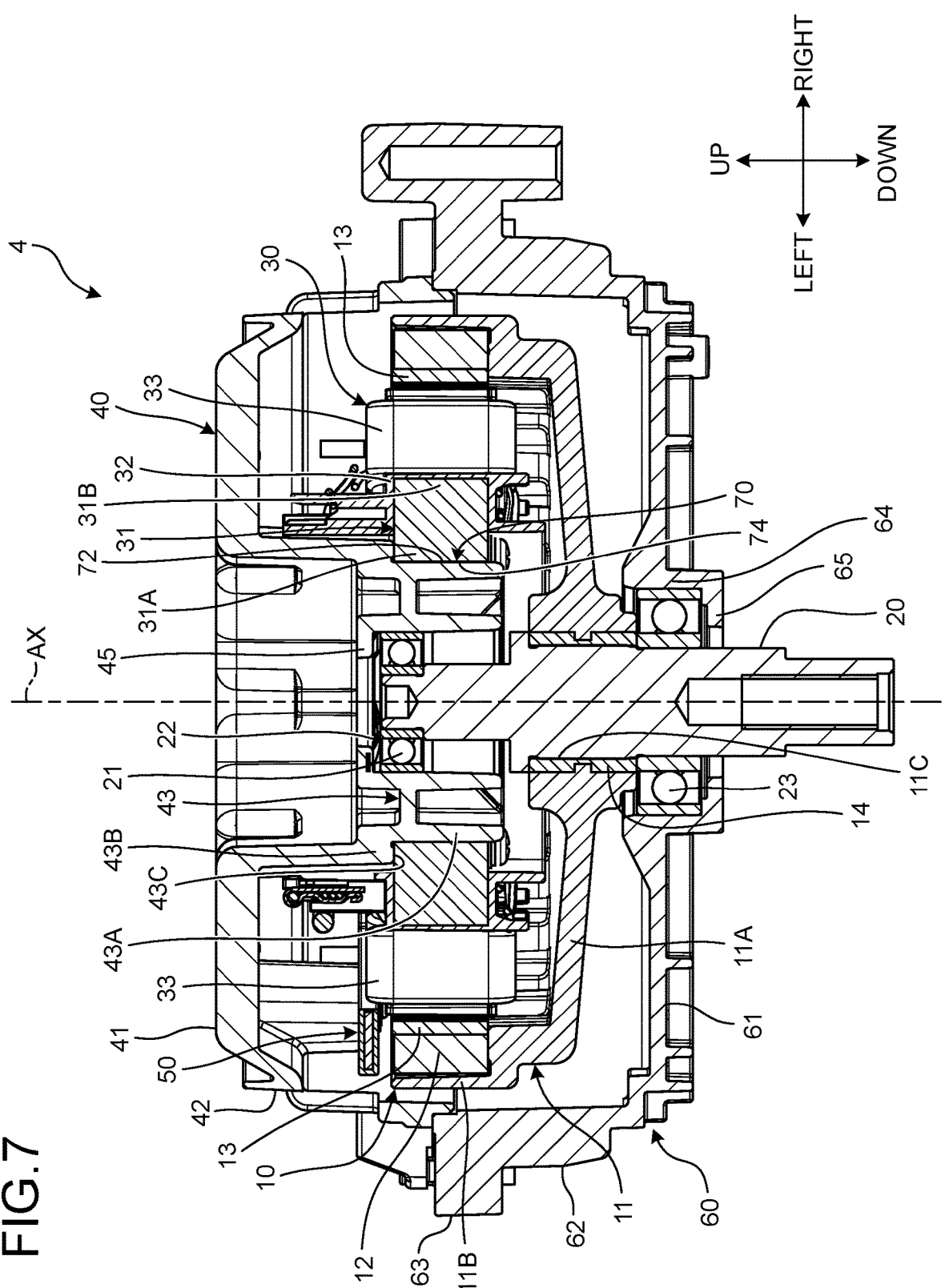
FIG. 7 is a longitudinal, cross-sectional view that shows the motor according to the embodiment.
Figure 8:
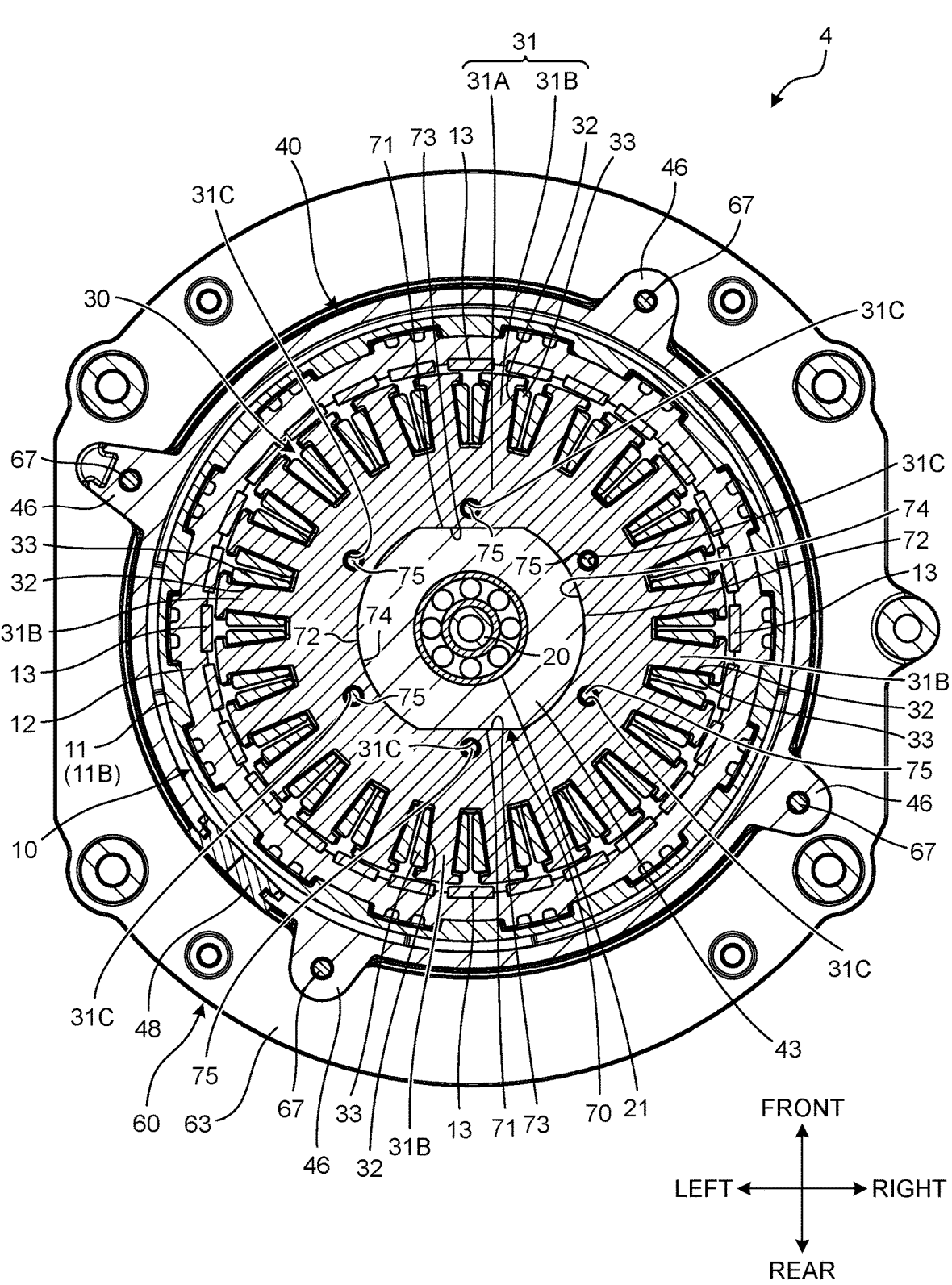
FIG. 8 is a transverse, cross-sectional view that shows the motor according to the embodiment.

FIG. 2 is an oblique view, viewed from below, that shows the motor 4 according to the embodiment. FIG. 3 is an exploded, oblique view, viewed from below, that shows the motor 4 according to the embodiment. FIG. 4 is an oblique view, viewed from above, that shows the motor 4 according to the embodiment. FIG. 5 is an exploded, oblique view, viewed from above, that shows the motor 4 according to the embodiment. FIG. 6 is a front view that shows the motor 4 according to the embodiment. FIG. 7 is a longitudinal, cross-sectional view that shows the motor 4 according to the embodiment. FIG. 7 corresponds to a cross-sectional auxiliary view taken along line A-A in FIG. 4. FIG. 8 is a transverse, cross-sectional view that shows the motor 4 according to the embodiment. FIG. 8 corresponds to a cross-sectional auxiliary view taken along line B-B in FIG. 6. In the embodiment, the motor 4 is an outer-rotor-type brushless motor.

As shown in FIGS. 2-8, the motor 4 comprises a rotor 10, a rotor shaft 20, a stator 30, a stator base 40, a sensor board 50, and a motor housing 60.

The rotor 10 rotates relative to the stator 30. At least a portion of the rotor 10 is disposed around the stator 30. In other words, the rotor 10 is disposed on the outer-circumference side of the stator 30.

The rotor shaft 20 is fixed to the rotor 10. The rotor 10 and the rotor shaft 20 rotate about rotational axis AX. The cutting blade 5 is supported by the rotor shaft 20. The cutting blade 5 is driven by the rotor 10. In the embodiment, the cutting blade 5 is fixed to the rotor shaft 20. The cutting blade 5 is driven by the rotor 10 in a direct-drive mode (i.e. without a speed-reducing mechanism (gear transmission) operably disposed between the rotor shaft 20 and the cutting blade 5.

In the embodiment, the rotor 10 rotates at a rotational speed of 1,000-4,000 rpm.

In the embodiment, rotational axis AX of the motor 4 extends in the up-down (vertical) direction. The axial direction and the up-down direction are parallel to each other.

The rotor 10 comprises a rotor cup 11, a rotor core 12, and permanent magnets 13.

The rotor cup 11 is made of a metal alloy in which aluminum is the main component. The rotor cup 11 comprises a plate part 11A and a yoke part 11B.

The plate part 11A is substantially circular-ring shaped. The plate part 11A is disposed around rotational axis AX. The central axis of the plate part 11A and rotational axis AX coincide with each other. An opening 11C is provided in a center portion of the plate part 11A. At least a portion of the rotor shaft 20 is disposed in the interior of the opening 11C. In the embodiment, a bushing 14 is disposed between an outer surface of the rotor shaft 20 and an inner surface of the opening 11C.

The yoke part 11B is substantially circular-tube shaped. A lower-end portion of the yoke part 11B is connected to a circumferential-edge portion of the plate part 11A. The plate part 11A and the yoke part 11B are integral. The yoke part 11B is disposed such that it extends upward from the circumferential-edge portion of the plate part 11A. The yoke part 11B is disposed such that it surrounds the stator 30. The yoke part 11B is disposed around rotational axis AX. The central axis of the yoke part 11B and rotational axis AX coincide with each other.

The rotor core 12 comprises (is constituted by) a plurality of steel plates stacked (laminated) in the axial direction. The rotor core 12 is substantially circular-tube shaped. The rotor core 12 is disposed on the outer-circumference side of the stator 30. The rotor core 12 is supported by the rotor cup 11. At least a portion of the rotor cup 11 is disposed around the rotor core 12. The rotor core 12 is disposed radially inward of the yoke part 11B. The yoke part 11B is disposed around the rotor core 12. The rotor core 12 is supported on an inner-circumferential surface of the yoke part 11B.

Each of the permanent magnets 13 has a plate shape. Each of the permanent magnets 13 is a neodymium, sintered, plate magnet. The permanent magnets 13 are fixed to the rotor core 12. The permanent magnets 13 are disposed radially inward of the rotor core 12. The permanent magnets 13 are fixed to an inner-circumferential surface of the rotor core 12. In the embodiment, the permanent magnets 13 are fixed to the inner-circumferential surface of the rotor core 12 by a bonding agent (adhesive). A plurality of the permanent magnets 13 is provided such that the permanent magnets 13 are spaced apart in the circumferential direction. In the embodiment, 28 of the permanent magnets 13 are provided spaced apart in the circumferential direction. The plurality of permanent magnets 13 is provided such that they are equispaced in the circumferential direction. The N pole permanent magnets 13 and the S pole permanent magnets 13 are disposed in an alternating manner in (around) the circumferential direction.

The rotor shaft 20 extends in the axial direction. The rotor shaft 20 is fixed to the rotor 10. A lower portion of the rotor is disposed in the interior of the opening 11C of the plate part 11A. The rotor shaft 20 is fixed to the plate part 11A via the bushing 14. An upper-end portion of the rotor shaft 20 is disposed upward of an upper surface of the plate part 11A. A lower-end portion of the rotor shaft 20 is disposed downward of a lower surface of the plate part 11A.

The central axis of the rotor shaft 20 and rotational axis AX coincide with each other. The rotor shaft 20 is fixed to the rotor 10 such that the central axis of the rotor shaft 20 and the central axis of the yoke part 11B coincide with each other.

The stator 30 comprises a stator core 31, an insulator 32, and coils 33.

The stator core 31 comprises a plurality of steel plates stacked (laminated) in the axial direction. The stator core 31 comprises a yoke 31A and teeth 31B. The yoke 31A has a tube shape. The yoke 31A is disposed around rotational axis AX. The central axis of an outer-circumferential surface of the yoke 31A and rotational axis AX coincide with each other. The teeth 31B protrude radially outward from the outer-circumferential surface of the yoke 31A. A plurality of the teeth 31B is provided such that they are spaced apart in the circumferential direction. In the embodiment, twenty-four (24) of the teeth 31B are provided. Slots are respectively formed between of circumferentially-adjacent ones of the teeth 31B.

The insulator 32 is made of a synthetic resin (polymer) that has electrical insulating (isolating) properties. The insulator 32 is fixed to the stator core 31. The insulator 32 covers at least a portion of surfaces of the stator core 31. The insulator 32 covers at least a portion of each end surface of the yoke 31A oriented in the axial direction. The end surfaces of the yoke 31A include an upper-end surface, which is oriented toward the upward side, and a lower-end surface, which is oriented toward the downward side. In addition, the insulator 32 covers at least a portion of an outer surface of the yoke 31A, which is oriented outward in the radial direction. In addition, the insulator 32 covers at least a portion of surfaces of the teeth 31B.

In the embodiment, the stator core 31 and the insulator 32 are formed integrally. The insulator 32 is fixed to the stator core 31 by insert molding. After the synthetic resin (polymer), which has been hot-melted, has been injected into a mold that contains the stator core 31, the insulator 32, which is fixed to the stator core 31, is formed by solidifying the synthetic resin.

The coils 33 are mounted on the insulator 32. The coils 33 are respectively wound around the teeth 31B, with the insulator 32 interposed therebetween. Mounting surfaces of the teeth 31B, around which the coils 33 are wound, are covered by the insulator 32. Outer surfaces of the teeth 31B, which are oriented radially outward, are not covered by the insulator 32. The stator core 31 and the coils 33 are insulated (electrically isolated) from each other by the insulator 32. A plurality of the coils 33 is provided. In the embodiment, twenty-four (24) of the coils 33 are disposed in the circumferential direction.

The stator base 40 supports the stator 30. The stator base 40 supports the stator core 31. The stator base 40 is fixed to the stator core 31. The stator base 40 is made of a metal such as aluminum or an aluminum alloy. The stator base 40 comprises a plate part 41, a circumferential-wall part 42, and a pipe part 43.

The plate part 41 is substantially circular-ring shaped. The plate part 41 is disposed around rotational axis AX. The plate part 41 is disposed upward of the stator 30.

The circumferential-wall part 42 is substantially circular-tube shaped. An upper-end portion of the circumferential-wall part 42 is connected to a circumferential-edge portion of the plate part 41. The plate part 41 and the circumferential-wall part 42 are integral. The circumferential-wall part 42 is disposed such that it extends downward from the circumferential-edge portion of the plate part 41. The circumferential-wall part 42 is disposed such that it surrounds the yoke part 11B of the rotor cup 11.

The pipe part 43 is substantially circular-tube shaped. The pipe part 43 protrudes downward from a center portion of a lower surface of the plate part 41. The pipe part 43 is disposed around rotational axis AX. The central axis of the pipe part 43 and rotational axis AX coincide with each other.

At least a portion of the pipe part 43 is disposed in the interior of the stator core 31. The central axis of the pipe part 43 and the central axis of the yoke 31A coincide with each other.

In the embodiment, the pipe part 43 comprises a small-diameter part 43A and a large-diameter part 43B, which is disposed upward of the small-diameter part 43A. The small-diameter part 43A and the large-diameter part 43B each have a tube shape. The outer diameter of the large-diameter part 43B is larger than the outer diameter of the small-diameter part 43A. The stator core 31 is disposed around the small-diameter part 43A. The small-diameter part 43A is disposed in the interior of the stator core 31. The large-diameter part 43B is disposed on the outer side of the stator core 31. The large-diameter part 43B is disposed upward of the stator core 31. The stator core 31 is fixed to the pipe part 43. The stator base 40 is fixed to the stator 30 such that the central axis of the pipe part 43 and the central axis of the yoke 31A coincide with each other.

The motor 4 comprises a motor-positioning mechanism 70, which positions the stator base 40 and the stator 30. The motor-positioning mechanism 70 positions the stator base 40 and the stator core 31.

In the embodiment, an outer surface of the small-diameter part 43A of the pipe part 43 includes base, flat-surface areas 71. The base, flat-surface areas 71 are provided at at least two locations in the circumferential direction. In the embodiment, the base, flat-surface areas 71 are provided on the front side and the rear side, one on each side, of rotational axis AX. The two base, flat-surface areas 71 are substantially parallel to each other. In addition, the outer surface of the small-diameter part 43A of the pipe part 43 includes base, curved-surface areas 72. The base, curved-surface areas 72 are provided on the left side and the right side, one on each side, of rotational axis AX.

An inner surface of the yoke 31A of the stator core 31 includes stator, flat-surface areas 73, which are in contact with the base, flat-surface areas 71, and stator, curved-surface areas 74, which are in contact with the base, curved-surface areas 72.

The motor-positioning mechanism 70 includes the base, flat-surface areas 71 and the stator, flat-surface areas 73, which are in contact with the base, flat-surface areas 71. In addition, the motor-positioning mechanism 70 includes the base, curved-surface areas 72 and the stator, curved-surface areas 74, which are in contact with the base, curved-surface areas 72.

The stator base 40 and the stator core 31 are positioned in both the circumferential direction and the radial direction owing to the contact between the base, flat-surface areas 71 and the stator, flat-surface areas 73. In addition, the stator base 40 and the stator core 31 are positioned in both the circumferential direction and the radial direction owing to the contact between the base, curved-surface areas 72 and the stator, curved-surface areas 74.

The pipe part 43 has a base-support surface 43C, which is provided at the boundary between the small-diameter part 43A and the large-diameter part 43B. The base-support surface 43C is oriented downward. The base-support surface 43C is disposed around the small-diameter part 43A.

The base-support surface 43C is in contact with an upper-end surface of the stator core 31. The base-support surface 43C is in contact with the upper-end surface of the yoke 31A.

The motor-positioning mechanism 70 includes the base-support surface 43C. The stator base 40 and the stator core 31 are positioned in the axial direction owing to the contact between the base-support surface 43C, which is provided on the pipe part 43, and the upper-end surface of the yoke 31A.

In the embodiment, the stator core 31 and the stator base 40 are fixed by screws 75. Core-screw openings 31C are provided in the yoke 31A of the stator core 31. Each of the core-screw openings 31C includes a through hole, which is formed such that it passes through the upper-end surface and the lower-end surface of the yoke 31A. A plurality of the core-screw openings 31C is provided such that they are spaced apart around rotational axis AX. Screw bosses 44 are disposed around the pipe part 43. The screw bosses 44 are disposed around the large-diameter part 43B. Base-screw holes 44A are provided in the screw bosses 44. A plurality of the screw bosses 44 is provided such that they are spaced apart around the large-diameter part 43B. That is, the plurality of base-screw holes 44A is provided such that they are spaced apart around rotational axis AX.

At least six of the core-screw openings 31C and at least six of the base-screw holes 44A are provided. In the embodiment, six of the core-screw openings 31C and six of the base-screw holes 44A are provided equispaced around rotational axis AX.

In the embodiment, the stator core 31 and the stator base 40 are fixed by six of the screws 75. The screws 75 are respectively inserted into the core-screw openings 31C from below the stator core 31. Tip portions of the screws 75, which are respectively inserted into the core-screw openings 31C, are respectively inserted into the base-screw holes 44A of the screw bosses 44. By coupling the screw threads of the screws 75 and the thread grooves of the base-screw holes 44A, the stator core 31 and the stator base 40 are fixed by the screws 75.

The motor-positioning mechanism 70 comprises the screws 75 respectively inserted into the base-screw holes 44A, which are provided in the stator base 40, via the core-screw openings 31C, which are provided in the stator core 31. The stator base 40 and the stator core 31 are fixed by the screws 75.

The pipe part 43 supports the rotor shaft 20 via a bearing 21. The bearing 21 is disposed on the inner side of the pipe part 43. An upper portion of the rotor shaft 20 is disposed in the interior of the pipe part 43. The bearing 21 supports the upper portion of the rotor shaft 20 in a rotatable manner. The rotor shaft 20 is supported by the pipe part 43 via the bearing 21.

In the embodiment, the stator base 40 comprises a circular-ring plate part 45, which is disposed at an upper-end portion of the pipe part 43. An upper surface of the bearing 21 is disposed downward of a lower surface of the circular-ring plate part 45. A wave washer 22 is disposed between the upper surface of the bearing 21 and the lower surface of the circular-ring plate part 45. An outer-circumferential surface of the bearing 21 is supported on an inner surface of the pipe part 43. The upper surface of the bearing 21 is supported on the circular-ring plate part 45 via the wave washer 22.

The sensor board 50 supports the magnetic sensors 51, which detect the rotation of the rotor 10. The sensor board 50 is supported by the stator base 40. The sensor board 50 is in contact with the stator base 40. The sensor board 50 is fixed to the stator base 40.

The magnetic sensors 51 detect the permanent magnets 13 of the rotor 10. The magnetic sensors 51 are supported on the sensor board 50. More specifically, the magnetic sensors 51 detect the magnetic fluxes of the permanent magnets 13 and thereby detect the position of the rotor 10 in the rotational direction. That is, the magnetic sensors 51 detect the position of the rotor 10 in the rotational direction by detecting changes in the magnetic fields attendant with the rotation of the rotor 10. The sensor board 50 is supported on the stator base 40 such that the permanent magnets 13 and the magnetic sensors 51 oppose (face) each other. The sensor board 50 is disposed radially outward of the coils 33.

The motor housing 60 houses the rotor 10 and the stator 30. The motor housing 60 is connected to the stator base 40. The rotor 10 and the stator 30 are disposed in an interior space formed between the motor housing 60 and the stator base 40.

The motor housing 60 comprises a plate part 61, a circumferential-wall part 62, and a flange part 63.

The plate part 61 is substantially circular-ring shaped. The plate part 61 is disposed downward of the rotor cup 11. A pipe part 64 is provided at a center portion of the plate part 61. A lower portion of the rotor shaft 20 is disposed in the interior of the pipe part 64.

The motor housing 60 supports a bearing 23. The bearing 23 supports the lower portion of the rotor shaft 20 in a rotatable manner. In the embodiment, the motor housing 60 comprises a circular-ring plate part 65, which is disposed at a lower-end portion of the pipe part 64. A lower surface of the bearing 23 is disposed upward of an upper surface of the circular-ring plate part 65. An outer-circumferential surface of the bearing 23 is supported on an inner surface of the pipe part 64. The lower surface of the bearing 23 is supported on the upper surface of the circular-ring plate part 65.

The circumferential-wall part 62 is substantially circular-tube shaped. A lower-end portion of the circumferential-wall part 62 is supported by a circumferential-edge portion of the plate part 61. The circumferential-wall part 62 protrudes upward from a circumferential-edge portion of the plate part 61. The circumferential-wall part 62 is disposed such that it surrounds at least a portion of the rotor cup 11.

The flange part 63 is connected to an upper-end portion of the circumferential-wall part 62. The flange part 63 is provided such that it extends radially outward from an upper-end portion of the circumferential-wall part 62. A plurality of through holes 66 is provided in the flange part 63. In the embodiment, four of the through holes 66 are provided spaced apart in the circumferential direction. A plurality of screw bosses 46 is provided on the circumferential-wall part 42 of the stator base 40. Four of the screw bosses 46 are provided spaced apart in the circumferential direction. A screw hole is provided in each of the four screw bosses 46. The stator base 40 and the motor housing 60 are fixed by four screws 67. The screws 67 are respectively inserted into the through holes 66 from below the flange part 63. Tip portions of the screws 67, which are respectively inserted into the through holes 66, are respectively inserted into the screw holes of the screw bosses 46. By coupling the screw threads of the screws 67 and the thread grooves of the screw holes of the screw bosses 46, the stator base 40 and the motor housing 60 are fixed by the screws 67.

A plurality of openings 47 is provided in the circumferential-wall part 42 of the stator base 40. A cushioning member (e.g., an elastomer) 48 is disposed in one of the openings 47 among the plurality of openings 47. Rubber is an illustrative example of a material that forms the cushioning member 48. At least a portion of each of power-supply lines 91, which are described below, is supported by the cushioning member 48 disposed in the opening 47. Owing to the cushioning member 48, friction between the power-supply lines 91 is curtailed.

Ventilation paths 68 are respectively provided in portions of the plate part 61. The ventilation paths 68 respectively include passageways, each having a labyrinthine structure.

In an embodiment in which a cooling fan is fixed to a lower-end portion of the rotor shaft 20, the cooling fan rotates in response to rotation of the rotor shaft 20. When the cooling fan rotates, the cooling fan suctions in air from the interior space between the stator base 40 and the motor housing 60 via the ventilation paths 68. Owing to the suctioning of the air via the ventilation paths 68, the air around the motor 4 flows into the interior space via the openings 47. Thereby, the motor 4 is cooled.

Discharge ports 15 for discharging foreign matter in the interior of the rotor cup 11 are provided in at least a portion of the rotor cup 11. Two of the discharge ports 15 are provided in the plate part 11A. For example, if water penetrates to the interior of the rotor cup 11, the water in the interior of the rotor cup 11 is discharged to the exterior of the rotor cup 11 via the discharge ports 15.

As shown in FIG. 2, the motor housing 60 comprises screw bosses 600, which are respectively fixed to decks 200 of the housing 2. Through holes 201 are respectively provided in the decks 200. Screw holes 601 are respectively provided in the screw bosses 600. The decks 200 of the housing 2 and the motor housing 60 are fixed by screws 202. The screws 202 are respectively inserted into the through holes 201 from below the decks 200. Tip portions of the screws 202, which are respectively inserted into the through holes 201, are respectively inserted into the screw holes 601 of the screw bosses 600. By coupling the screw threads of the screws 202 and the thread grooves of the screw holes 601, the decks 200 of the housing 2 and the motor housing 60 are fixed by the screws 202.

In addition, the motor housing 60 comprises screw bosses 602, which are fixed to a baffle 203. The baffle 203 changes the flow of the air in the interior of the motor housing 60. The baffle 203 is disposed such that it opposes a lower surface of the motor housing 60. An opening 203A is formed in a center portion of the baffle 203. The rotor shaft 20 is inserted into the opening 203A. Through holes 204 are provided in the baffle 203. Screw holes 603 are respectively provided in the screw bosses 602. The baffle 203 and the motor housing 60 are fixed by screws 205. The screws 205 are respectively inserted into the through holes 204 from below the baffle 203. Tip portions of the screws 205, which are respectively inserted into the through holes 204, are respectively inserted into the screw holes 603 of the screw bosses 602. By coupling the screw threads of the screws 205 and the thread grooves of the screw holes 603, the baffle 203 and the motor housing 60 are fixed by the screws 205.

Rotor and Stator

Figure 9:
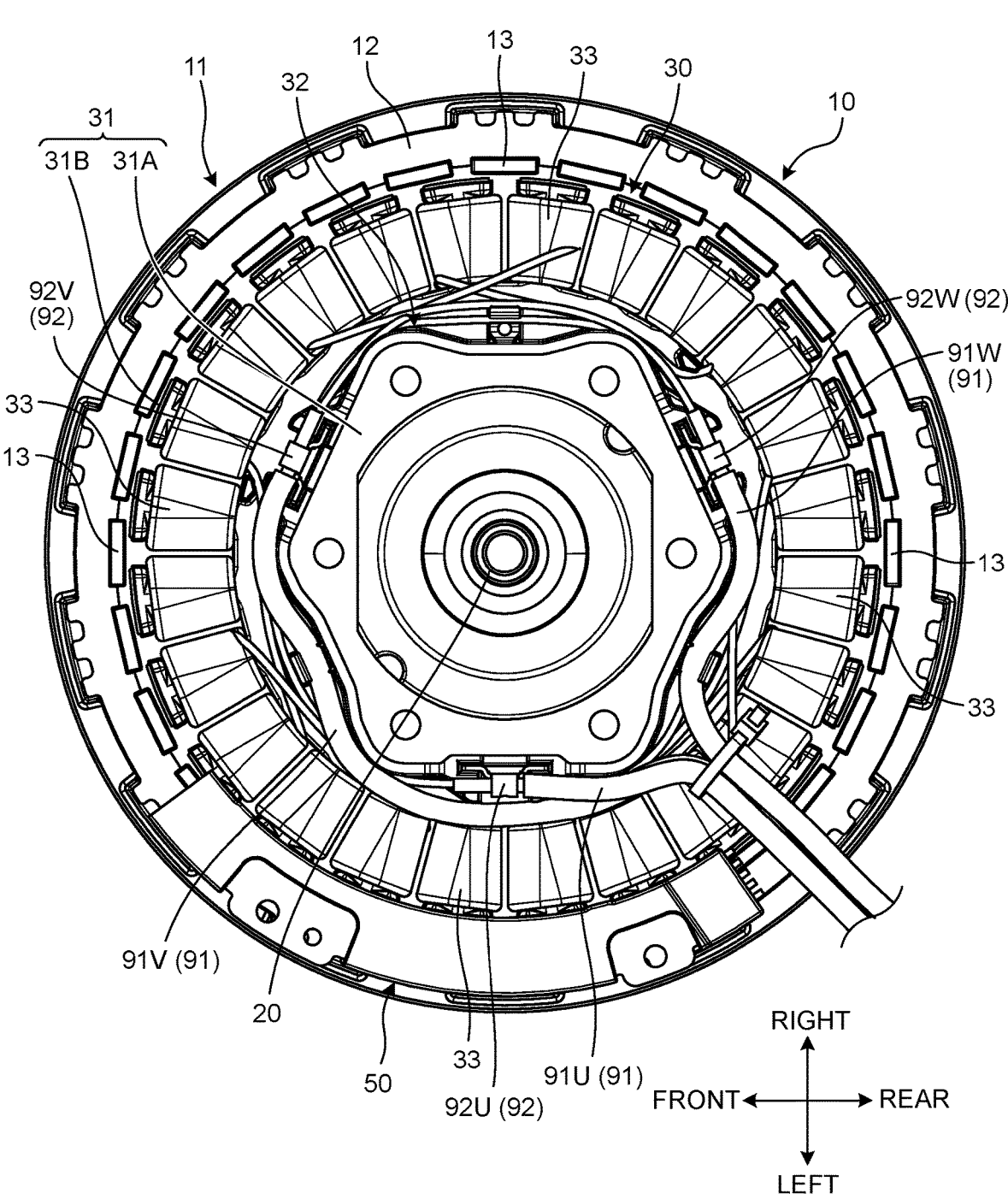
FIG. 9 shows a rotor and a stator according to the embodiment as viewed from above.
Figure 10:
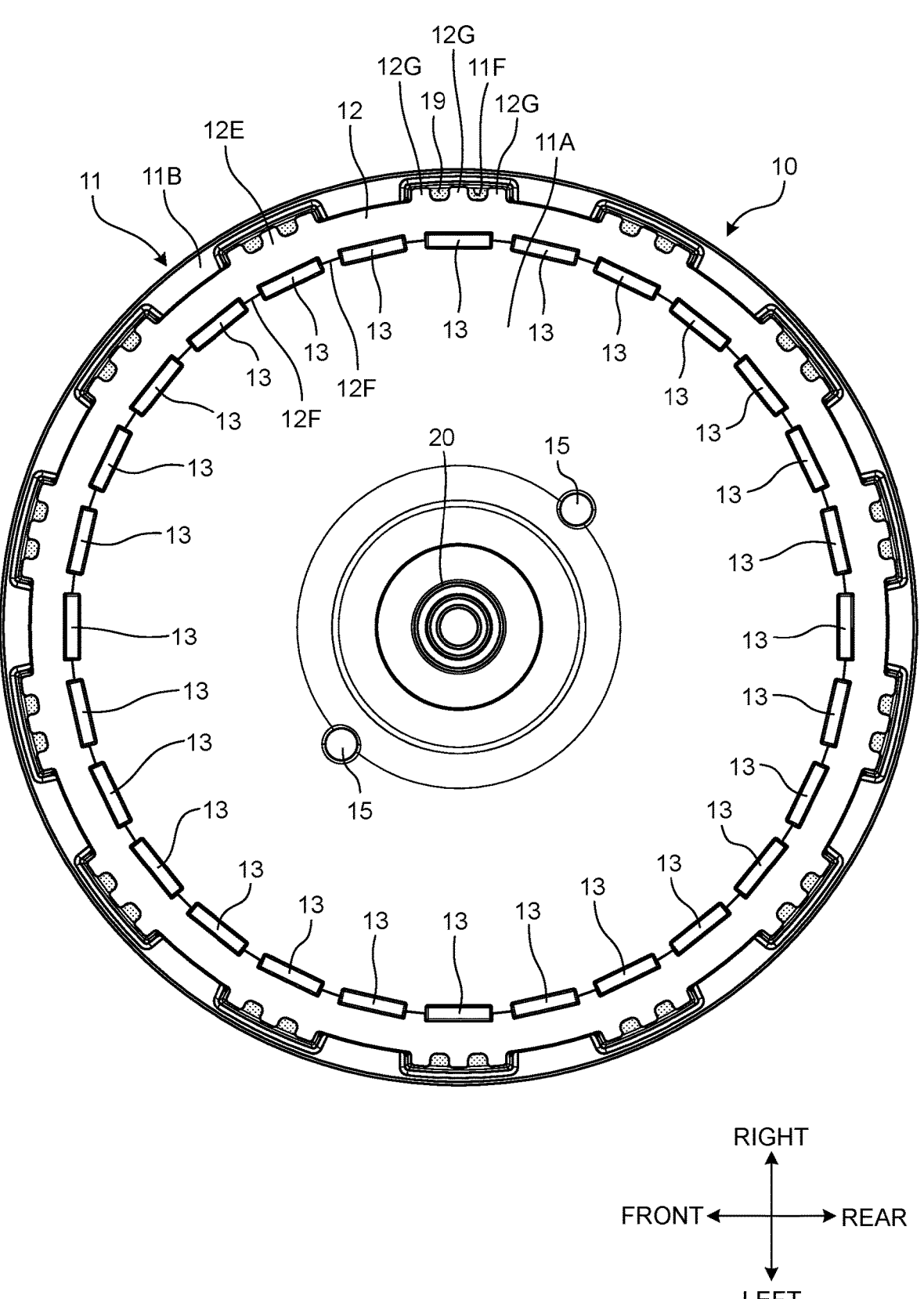
FIG. 10 shows the rotor according to the embodiment as viewed from above.
Figure 11:
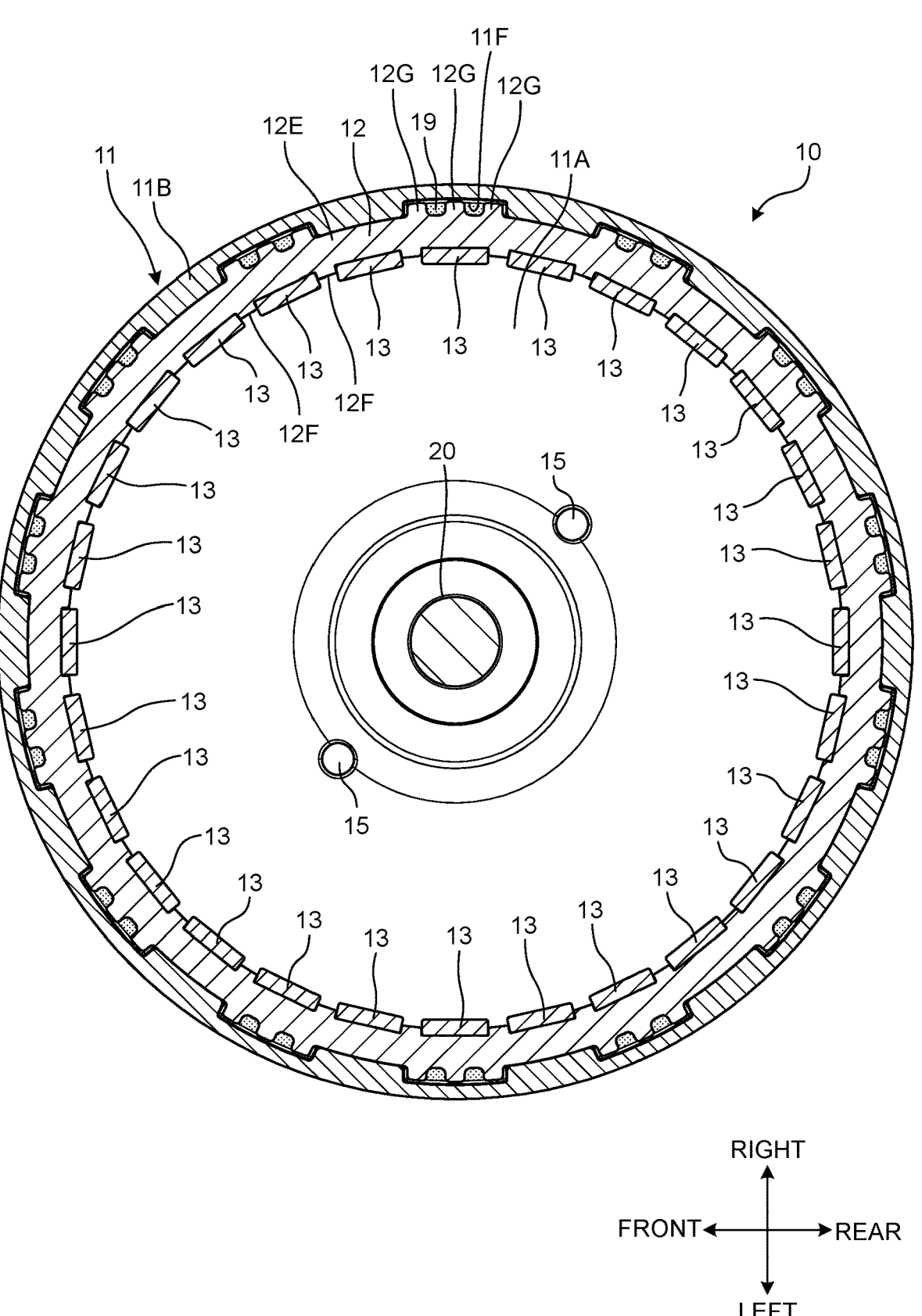
FIG. 11 is a transverse, cross-sectional view that shows the rotor according to the embodiment.
Figure 12:
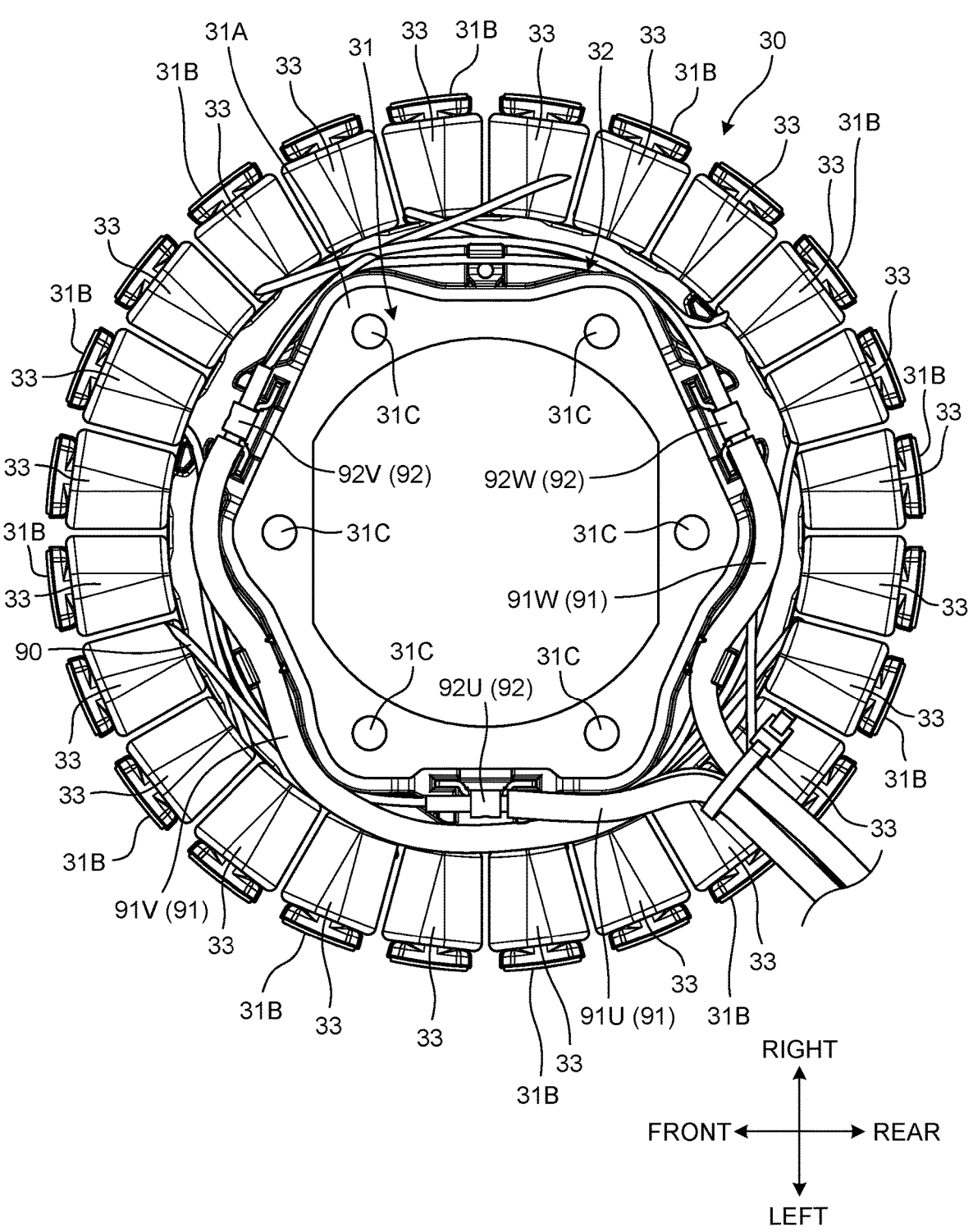
FIG. 12 shows the stator according to the embodiment as viewed from above.
Figure 13:
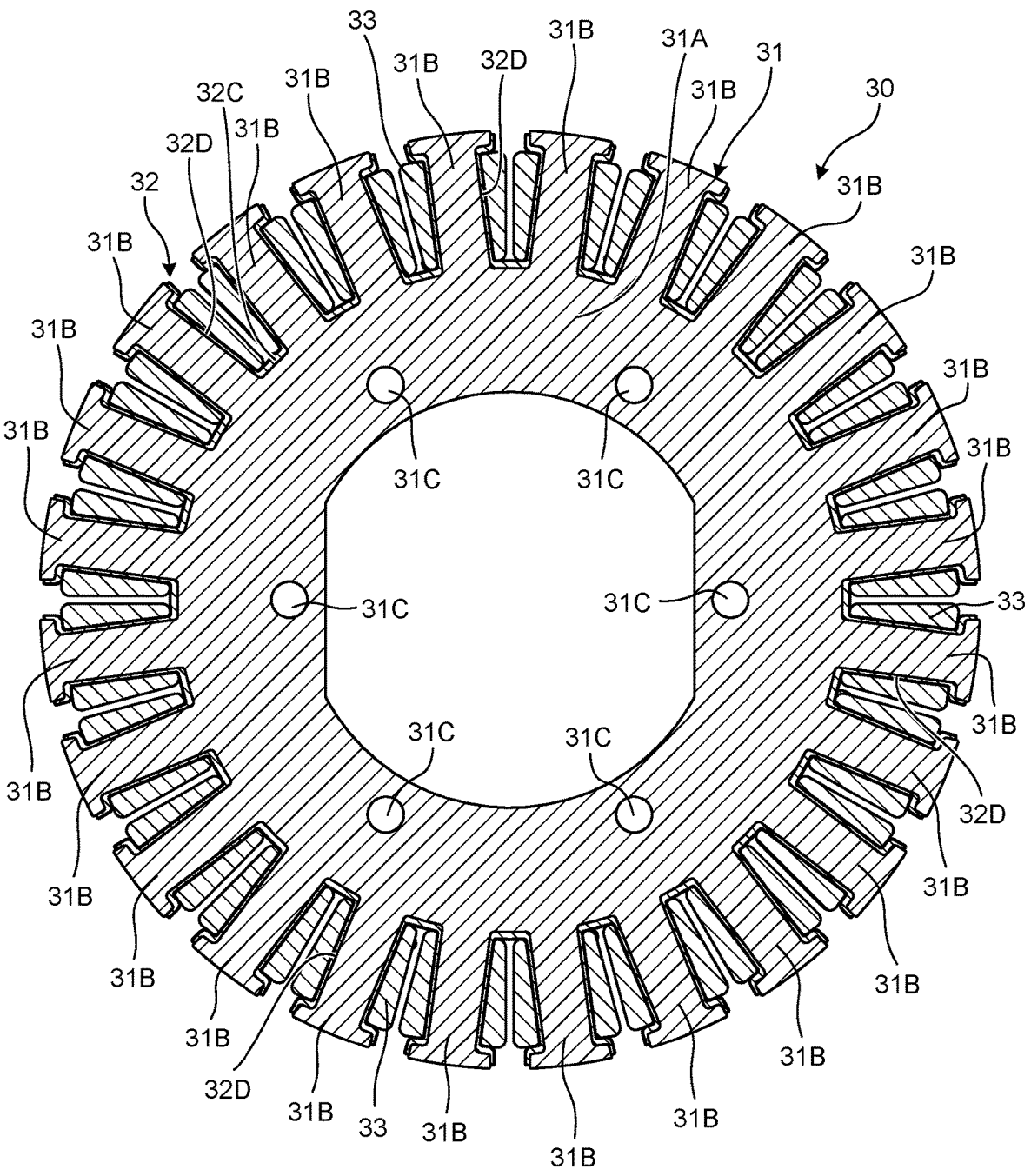
FIG. 13 is a transverse, cross-sectional view that shows the stator according to the embodiment.

FIG. 9 shows the rotor 10 and the stator 30 according to the embodiment as viewed from above. FIG. 10 shows the rotor 10 according to the embodiment as viewed from above. FIG. 11 is a transverse, cross-sectional view that shows the rotor 10 according to the embodiment. FIG. 12 shows the stator 30 according to the embodiment as viewed from above. FIG. 13 is a transverse, cross-sectional view that shows the stator 30 according to the embodiment.

The rotor 10 comprises: the rotor cup 11; the rotor core 12, which is supported on the rotor cup 11; and the permanent magnets 13, which are fixed to the inner-circumferential surface of the rotor core 12.

The rotor cup 11 comprises the plate part 11A and the yoke part 11B.

The rotor core 12 comprises: a ring part 12E; and inward protruding parts 12F, which protrude radially inward from an inner-circumferential surface of the ring part 12E. The inward protruding parts 12F are respectively disposed between adjacent ones of the permanent magnets 13 in the circumferential direction.

Outward protruding parts 12G, which are in contact with the inner-circumferential surface of the yoke part 11B of the rotor cup 11, are provided on an outer-circumferential surface of the ring part 12E of the rotor core 12. A plurality of the outward protruding parts 12G is provided such that they are spaced apart in the circumferential direction. Recessed parts 11F, in which the outward protruding parts 12G are respectively disposed, are provided on an inner-circumferential surface of the rotor cup 11. Three of the outward protruding parts 12G are disposed in each of the recessed parts 11F.

With regard to the plurality (3) of outward protruding parts 12G disposed in each of the recessed parts 11F, the spaces between adjacent ones of the outward protruding parts 12G are filled with the bonding agent. By filling with the bonding agent, a bonding-agent layer 19 is disposed between the adjacent ones of the outward protruding parts 12G. The bonding-agent layers 19 fix the rotor core 12 and the rotor cup 11.

As shown in FIG. 13, the insulator 32 comprises outer-circumferential covering parts 32C and a tooth-covering parts 32D. Each of the outer-circumferential covering parts 32C is disposed such that it covers the outer-circumferential surface of the yoke 31A, which is oriented outward in the radial direction. Each of the tooth-covering parts 32D is disposed such that it covers the mounting surface of the corresponding tooth 31B, around which the corresponding coil 33 is wound.

The plurality of coils 33 is formed by winding a single wire 90. The single wire 90 is successively wound around the teeth 31B, with the tooth-covering parts 32D respectively interposed therebetween. The first coils 33 and the second coils 33, each of which is wound following the corresponding first coil 33, are connected by the wire 90.

Electric power (current) output from the battery pack 9 is supplied to the coils 33. Drive currents are respectively supplied to the coils 33. More specifically, the drive currents from the battery pack 9 are respectively supplied to the coils 33 via the power-supply lines 91 and fusing terminals 92. In other words, the drive currents supplied to the coils 33 respectively flow through the power-supply lines 91 and the fusing terminals 92.

The power-supply lines 91 and the fusing terminals 92 are each supported on the insulator 32. The power-supply lines 91 and the fusing terminals 92 are each disposed upward of the upper-end surface of the stator core 31.

The motor 4 is a three-phase motor. Each of the twenty-four (24) coils 33 is allocated to a respective one of the phases, i.e. to the U (UV) phase, to the V (VW) phase, or to the W (WU) phase. The power-supply lines 91 include: a power-supply line 91U, through which a U-phase drive current flows; a power-supply line 91V, through which a V-phase drive current flows; and a power-supply line 91W, through which a W-phase drive current flows.

The fusing terminals 92 are electrically connected (fused) to respective portions of the single wire 90, which wire portions respectively protrude from the coils 33. The fusing terminals 92 include: a (first) fusing terminal 92U, through which the U-phase drive current flows; a (second) fusing terminal 92V, through which the V-phase drive current flows; and a (third) fusing terminal 92W, through which the W-phase drive current flows.

The power-supply line 91U is connected to the fusing terminal 92U. The power-supply line 91V is connected to the fusing terminal 92V. The power-supply line 91W is connected to the fusing terminal 92W.

Controller

Figure 14:
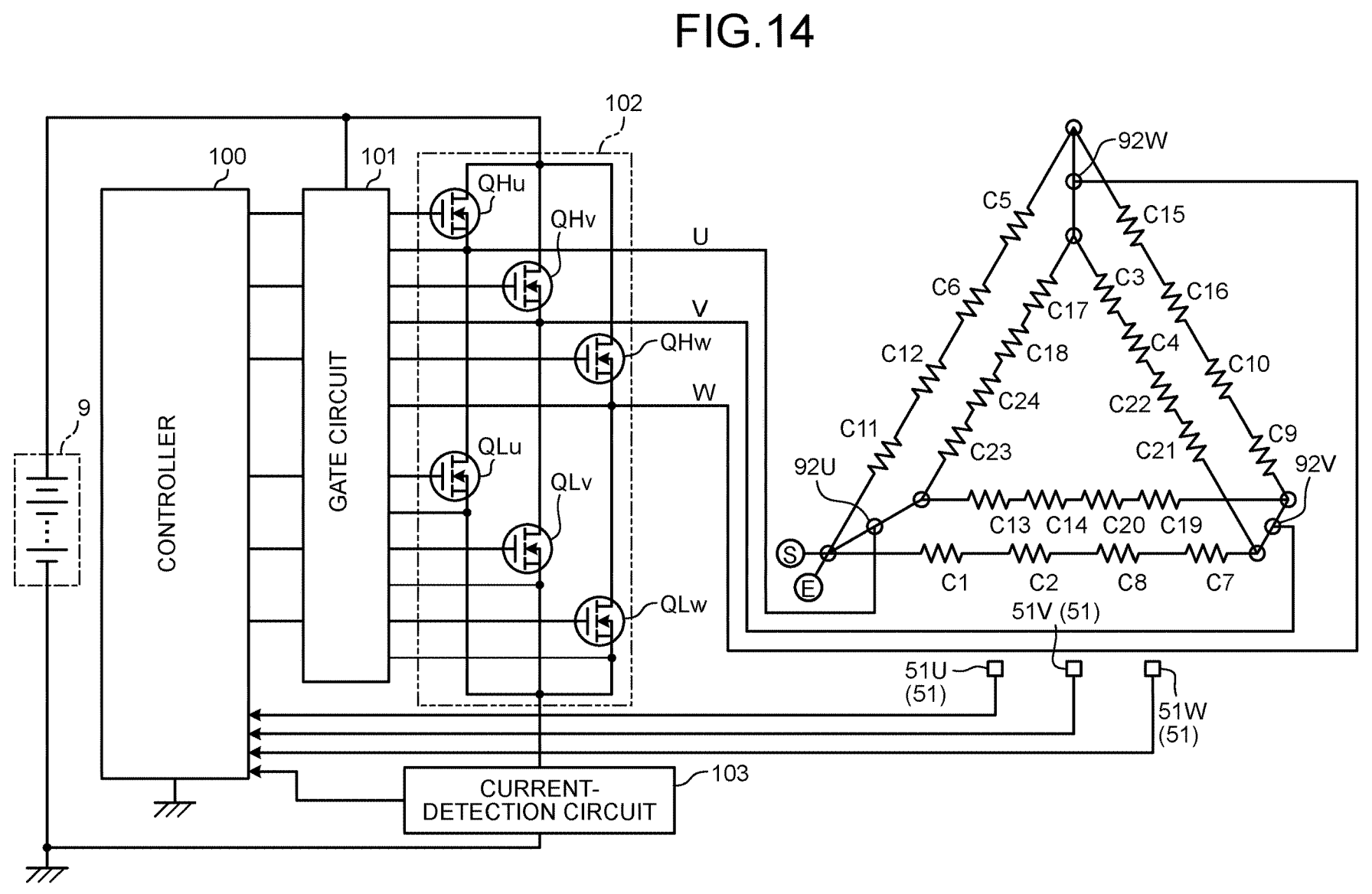

FIG. 14 is a schematic drawing that shows electric circuits of the electric work machine 1 according to the embodiment. As described above, in the embodiment, twenty-four (24) of the coils 33 are provided. In FIG. 14, the twenty-four coils 33 are assigned the numbers C1-C24, respectively. The twenty-four coils 33 are formed by winding the single wire 90 as was described above. As shown in FIG. 14, the winding of the single wire 90 starts from a winding-start portion S. The wire 90 is successively wound around each of the teeth 31B such that the coils 33 are successively formed. After the twenty-four coils 33 have been formed, the winding of the wire 90 is ended at a winding-end portion E.

The coils 33 are delta connected. The coils C1, C2, C8, C7, C13, C14, C20, C19 are allocated to the U (UV) phase. The coils C9, C10, C16, C15, C21, C22, C4, C3 are allocated to the V (VW) phase. The coils C5, C6, C12, C11, C17, C18, C24, C23 are allocated to the W (WU) phase.

The coils C1, C2, C8, C7 are connected in series, and the coils C13, C14, C20, C19 are connected in series. In addition, the coils C1, C2, C8, C7 and the coils C13, C14, C20, C19 are connected in parallel.

The coils C9, C10, C16, C15 are connected in series, and the coils C21, C22, C4, C3 are connected in series. In addition, the coils C9, C10, C16, C15 and the coils C21, C22, C4, C3 are connected in parallel.

The coils C5, C6, C12, C11 are connected in series, and the coils C17, C18, C24, C23 are connected in series. In addition, the coils C5, C6, C12, C11 and the coils C17, C18, C24, C23 are connected in parallel.

That is, in the embodiment, the twenty-four coils 33 are delta connected in a 2p4s configuration.

The electric work machine 1 comprises a controller 100, a gate circuit 101, an inverter 102, and a current-detection circuit 103.

The controller 100 comprises a circuit board, on which a plurality of electronic parts is mounted. Illustrative examples of the electronic parts mounted on the circuit board include: a processor, such as a CPU (central processing unit); nonvolatile memory, such as ROM (read-only memory) and storage; and volatile memory, such as RAM (random-access memory).

The inverter 102 supplies the drive currents to the coils 33 using the electric power supplied from the battery pack 9. The inverter 102 comprises six switching devices QHu, QHv, QHw, Qlu, QLv, QLw. Each of the switching devices Qhu, QHv, QHw, Qlu, QLv, QLw comprises a field-effect transistor (FET: field-effect transistor).

The switching device Qhu is disposed between the fusing terminal 92U and the power-supply line connected to the positive electrode of the battery pack 9. The switching device QHv is disposed between the fusing terminal 92V and the power-supply line connected to the positive electrode of the battery pack 9. The switching device QHw is disposed between the fusing terminal 92W and the power-supply line connected to the positive electrode of the battery pack 9. When the switching device Qhu turns ON, the fusing terminal 92U and the power-supply line become electrically connected. When the switching device QHv turns ON, the fusing terminal 92V and the power-supply line become electrically connected. When the switching device QHw turns ON, the fusing terminal 92W and the power-supply line become electrically connected.

The switching device Qlu is disposed between the fusing terminal 92U and the ground line connected to the negative electrode of the battery pack 9. The switching device QLv is disposed between the fusing terminal 92V and the ground line connected to the negative electrode of the battery pack 9. The switching device QLw is disposed between the fusing terminal 92W and the ground line connected to the negative electrode of the battery pack 9. When the switching device Qlu turns ON, the fusing terminal 92U and the ground line become electrically connected. When the switching device QHv turns ON, the fusing terminal 92V and the ground line become electrically connected. When the switching device QHw turns ON, the fusing terminal 92W and the ground line become electrically connected.

The gate circuit 101 is a drive circuit that drives (controls, turns ON/OFF) the switching devices QHu, QHv, QHw, QLu, QLv, QLw. The controller 100 outputs control signals to the gate circuit 101 to respectively drive (control, turn ON/OFF) the switching devices QHu, QHv, QHw, QLu, QLv, QLw of the inverter 102.

The current-detection circuit 103 is disposed in an energization (current) path that extends from the inverter 102 to the negative electrode of the battery pack 9. The current-detection circuit 103 outputs a signal having a voltage that corresponds to the electric current flowing through the energization path. The controller 100 can detect the drive currents flowing through the coils 33 based on output signals of the current-detection circuit 103.

Three of the magnetic sensors 51 are provided. The magnetic sensors 51 comprise: a (first) magnetic sensor 51U, which corresponds to the U (UV) phase; a (second) magnetic sensor 51V, which corresponds to the V (VW) phase; and a (third) magnetic sensor 51W, which corresponds to the W (WU) phase. Based on changes in the magnetic fields received from the rotating rotor 10, the detection signals output from the magnetic sensor 51U, the magnetic sensor 51V, and the magnetic sensor 51W each switch between a HIGH-level detection signal and a LOW-level detection signal every 180° of electrical angle. The detection signals output from the magnetic sensors 51 are input to the controller 100.

Based on the detection signals from the magnetic sensors 51, the controller 100 controls (determines) the electric power (current) supplied to the coils 33. The controller 100 controls the gate circuit 101 based on the detection signals from the magnetic sensor 51U, the magnetic sensor 51V, and the magnetic sensor 51W, and thereby drives the switching devices QHu, QHv, QHw, QLu, QLv, QLw of the inverter 102. By controlling the switching devices QHu, QHv, QHw, QLu, QLv, QLw of the inverter 102, the drive currents, which are respectively supplied to the U (UV) phase coils 33, the V (VW) phase coils 33, and the W (WU) phase coils 33, are controlled.

In a first drive pattern in which the switching devices QHv, QLu are turned ON, a drive current flows, from the fusing terminal 92V to the fusing terminal 92U, through the plurality of coils 33 allocated to the UV phase. Herein, the term "drive pattern" is intended to mean the duty cycle of a pulse width modulation (PWM) technique for energizing the coils 33 of the motor 4. The duty cycle is varied in order to change the rotational speed of the rotor 10.

In a second drive pattern in which the switching devices QHw, QLu are turned ON, a drive current flows, from the fusing terminal 92W to the fusing terminal 92U, through the plurality of coils 33 allocated to the WU phase.

In a third drive pattern in which the switching devices QHw, QLv are turned ON, a drive current flows, from the fusing terminal 92W to the fusing terminal 92V, through the plurality of coils 33 allocated to the VW phase.

In a fourth drive pattern in which the switching devices QHu, QLv are turned ON, a drive current flows, from the fusing terminal 92U to the fusing terminal 92V, through the plurality of coils 33 allocated to the UV phase.

In a fifth drive pattern in which the switching devices QHu, QLw are turned ON, a drive current flows, from the fusing terminal 92U to the fusing terminal 92W, through the plurality of coils 33 allocated to the WU phase.

In a sixth drive pattern in which the switching devices QHv, QLw are turned ON, a drive current flows, from the fusing terminal 92V to the fusing terminal 92W, through the plurality of coils 33 allocated to the VW phase.

By virtue of the drive currents being successively supplied to the plurality of coils 33 allocated to the UV phase, to the plurality of coils 33 allocated to the VW phase, and to the plurality of coils 33 allocated to the WU phase, a rotating magnetic field is (changing magnetic fields are) generated in the motor 4, and thereby the rotor 10 rotates.

Pole Count and Slot Count

As described above, in the embodiment, the motor 4 comprises twenty-eight (28) of the permanent magnets 13 and twenty-four (24) of the coils 33. That is, the pole count, which denotes the number of permanent magnets 13, is 28. The slot count, which denotes the number of coils 33, is 24. Because the pole count is 28 and the slot count is 24, the motor 4 used as the power source of the electric work machine 1 can be made more lightweight and compact for a particular rated output power.

FIG. 15 is a drawing for explaining motors according to a working example and comparative examples. FIG. 15 shows the stator outer diameter, the pole count, the slot count, the rotor type (i.e. outer-rotor type or inner-rotor type), and the stator inner diameter of the motors according to Working Example K and Comparative Examples M1 to M9.

For outer-rotor type motors, the stator outer diameter indicates the (outer) diameter of the stator core, i.e. the diameter of the radially-outer surface of the stator core that faces the rotor. In other words, for outer-rotor type motors, the radially-outer surface of the stator core refers to outer-end surfaces of the teeth, which are oriented (extend) radially outward. That is, for outer-rotor type motors, the stator outer diameter refers to the maximum value of the dimension of the stator core in the radial direction.

For inner-rotor type motors, the stator inner diameter indicates the (inner) diameter of the stator core, i.e. the diameter of the radially-inner surface of the stator core that faces the rotor. In other words, for inner-rotor type motors, the radially-outer surface of the stator core refers to inner-end surfaces of the teeth, which are oriented (extend) radially inward. That is, for inner-rotor type motors, the stator inner diameter refers to the minimum value of the dimension of the stator core in the radial direction.

In the explanation below, the stator outer diameter of the outer-rotor type and the stator inner diameter of the inner-rotor type are generically called the "stator diameter" as appropriate. The stator diameter indicates the diameter of the stator core at the surface of the stator core that faces the rotor.

The motor 4 according to Working Example K is a 28-pole/24-slot outer-rotor type motor, in which the pole count is 28 and the slot count is 24. The stator outer diameter is 117.3 mm.

The motor according to Comparative Example M1 is a 20-pole/18-slot outer-rotor type motor, in which the pole count is 20 and the slot count is 18. The stator outer diameter is 117.3 mm.

The motor according to Comparative Example M2 is a 4-pole/6-slot inner-rotor type motor, in which the pole count is four and the slot count is six. The stator outer diameter is 44 mm, and the stator inner diameter is 21 mm.

The motor according to Comparative Example M3 is a 4-pole/6-slot inner-rotor type motor, in which the pole count is four and the slot count is six. The stator outer diameter is 52 mm, and the stator inner diameter is 27 mm.

The motor according to Comparative Example M4 is an 8-pole/12-slot inner-rotor type motor, in which the pole count is eight and the slot count is 12. The stator outer diameter is 80 mm, and the stator inner diameter is 53 mm.

The motor according to Comparative Example M5 is an 8-pole/12-slot inner-rotor type motor, in which the pole count is eight and the slot count is 12. The stator outer diameter is 122 mm, and the stator inner diameter is 69 mm.

The motor according to Comparative Example M6 is an 8-pole/12-slot inner-rotor type motor, in which the pole count is eight and the slot count is 12. The stator outer diameter is 99 mm, and the stator inner diameter is 53.5 mm.

The motor according to Comparative Example M7 is an 8-pole/12-slot inner-rotor type motor, in which the pole count is eight and the slot count is 12. The stator outer diameter is 99 mm, and the stator inner diameter is 52 mm.

The motor according to Comparative Example M8 is a 6-pole/9-slot outer-rotor type motor, in which the pole count is six and the slot count is nine. The stator outer diameter is 51 mm.

The motor according to Comparative Example M9 is a 10-pole/12-slot outer-rotor type motor, in which the pole count is 10 and the slot count is 12. The stator outer diameter is 113 mm.

Figure 16:
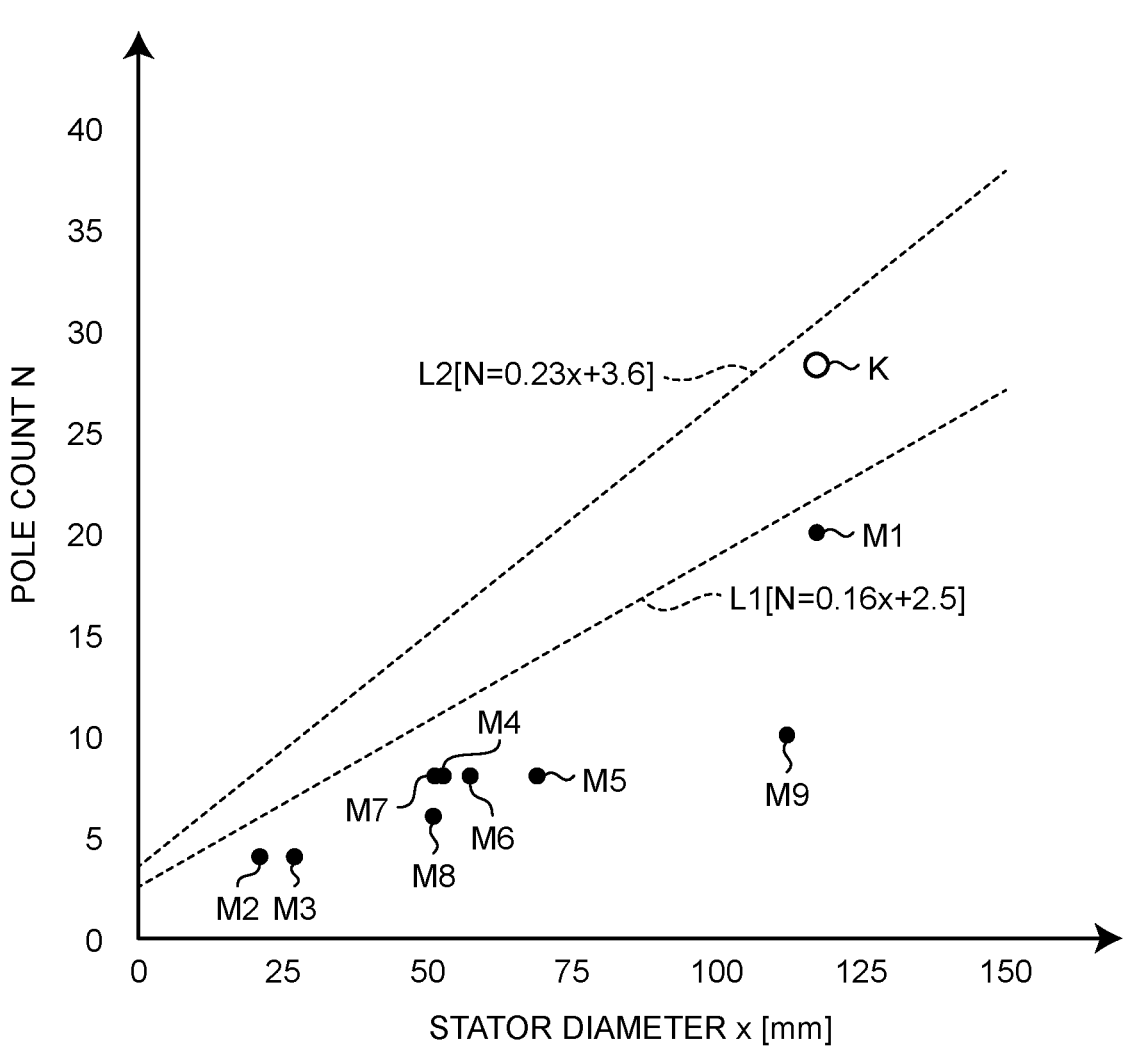
FIG. 16 is a graph that shows the relationship between the stator diameter and the pole count of the motors according to the working example and the comparative examples.

FIG. 16 is a drawing that shows the relationship between the stator diameter and the pole count of the motors according to the working example and the comparative examples. That is, FIG. 16 is a drawing in which the pole count N and the stator diameter x of Working Example K and Comparative Examples M1 to M9, shown in FIG. 15, are plotted on a graph. In FIG. 16, the abscissa represents the stator diameter x, and the ordinate represents the pole count N. As described above, the stator diameter x of an outer-rotor type indicates the stator outer diameter, and the stator diameter x of an inner-rotor type indicates the stator inner diameter.

The motor according to Working Example K satisfies the condition of Equation (1) below. The motors according to Comparative Examples M1 to M9 do not satisfy the condition of Equation (1) below.

$$0.16x+2.5 < N < 0.23x+3.6 \tag{1}$$

In FIG. 16, line L1 indicates the lower-limit threshold [N=0.16x+2.5], and line L2 indicates the upper-limit threshold [N=0.23x+3.6].

Line L1, which indicates the lower-limit threshold, is a line that indicates the permissible value of the motor mass. The motor mass is the sum of the mass of the rotor core, the mass of the permanent magnets, the mass of the stator core, and the mass of the coils. As a result of measuring the motor masses for Working Example K and Comparative Examples M1 to M9, it can be seen that the motor mass of Working Example K is smaller than the motor masses of Comparative Examples M1 to M9. That is, the larger the pole count and the slot count, the more the motor becomes lightweight and compact. For example, when Working Example K and Comparative Example M1 are compared, it can be seen that the motor mass of Working Example K, in which the slot count is large, is smaller than the motor mass of Comparative Example M1. This is understandable because, to generate a stipulated (particular) motor torque, the greater the number of the coils, the more that each coil can be made compact. In addition, when comparing Working Example K and Comparative Examples M2 to M9, it can be seen that the motor mass of Working Example K, in which the pole count and the slot count are large, is smaller than the motor masses of Comparative Examples M2 to M9. This is understandable because, to generate a stipulated (particular) motor torque, the greater the number of the coils, the more that each coil can be made compact; furthermore, the greater the number of permanent magnets, the more that each permanent magnet can be made compact and thin. Consequently, if the objective is to make the motor more lightweight and compact, it is preferable that the motor satisfies the condition of [0.16x+2.5<N], which is a range that is above that of line L1.

Line L2, which indicates the upper-limit threshold, is a line that indicates the permissible value of the detection accuracy of the magnetic sensors 51. Specifically, line L2 is a line in which the error in the detection accuracy of the rotor 10 due to the magnetic sensors 51 is ±7.5° in the electrical angle. As described above, the switching devices QHu, QHv, QHw, QLu, QLv, QLw of the inverter 102 are respectively switched ON and OFF using the first to sixth drive patterns. That is, the switching devices QHu, QHv, QHw, QLu, QLv, QLw of the inverter 102 switch at intervals of 60° in the electrical angle. If the pole count is too large, there is a possibility that it will become problematic for the magnetic sensors 51 to detect the magnetic fluxes of the permanent magnets with high accuracy. For example, if an error in the electrical angle of ±7.5° or more arises as the detection accuracy, the controllability of the motor 4 will decrease. Consequently, if the objective is to improve the detection accuracy of the magnetic sensors 51, it is preferable that the motor satisfy the condition of [N<0.23x+3.6], which is a range that is below line L2.

Figure 17:
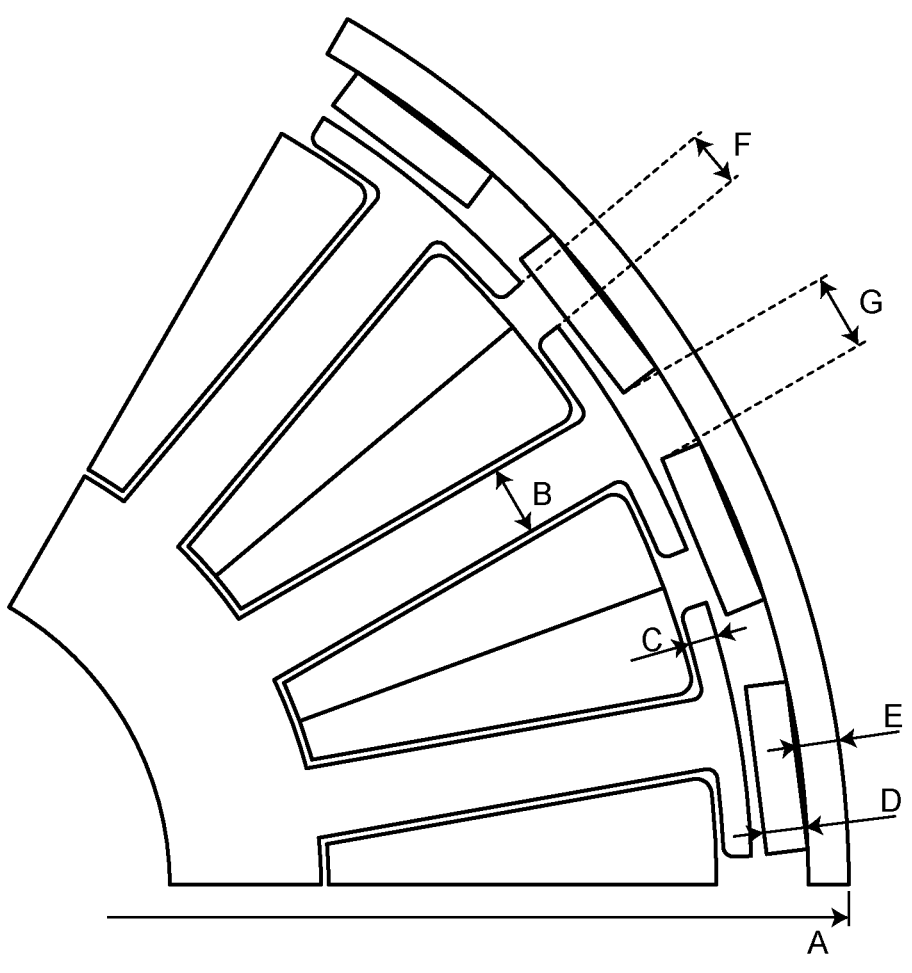
FIG. 17 is a drawing for explaining dimensions of various regions of the motor used as the power source of the electric work machine.

FIG. 17 is a drawing for explaining the dimensions of various regions of the motor used as the power source of the electric work machine 1. FIG. 17 shows various regions of an outer-rotor-type motor. In an outer-rotor-type motor, rotor outer diameter A, tooth width B, tooth-tip thickness C, magnet thickness D, yoke thickness E, aperture width F, and magnet-to-magnet distance G are defined.

Rotor outer diameter A refers to the outer diameter of the rotor core 12. Tooth width B refers to the dimension of each of the teeth 31B in the circumferential direction. Tooth-tip thickness C refers to the dimension in the radial direction of a projection portion, which is provided at the tip portion in the radially outward direction of each of the teeth 31B. Magnet thickness D refers to the thickness of each of the permanent magnets 13 and indicates the dimension in the radial direction of each of the permanent magnets 13. Yoke thickness E refers to the thickness of the ring part 12E and indicates the dimension in the radial direction of the ring part 12E of the rotor core 12. Aperture width F refers to the distance between the projection portions of two of the teeth 31B that are adjacent to each other in the circumferential direction. Magnet-to-magnet distance G refers to the distance between two of the permanent magnets 13 that are adjacent to each other in the circumferential direction.

With regard to the motor 4, which is used as the power source of the electric work machine 1, the dimensions of the regions described above are set substantially to the ranges below.

Rotor outer diameter A: 100 mm or more and 150 mm or less

Tooth width B: 3 mm or more and 12 mm or less

Tooth-tip thickness C: 2 mm or more and 4 mm or less

Magnet thickness D: 1 mm or more and 4 mm or less

Yoke thickness E: 1.5 mm or more and 6.0 mm or less

Aperture width F: 2.5 mm or more and 5.0 mm or less

Magnet-to-magnet distance G: 0.5 mm or more and 5.0 mm or less

Figure 18:
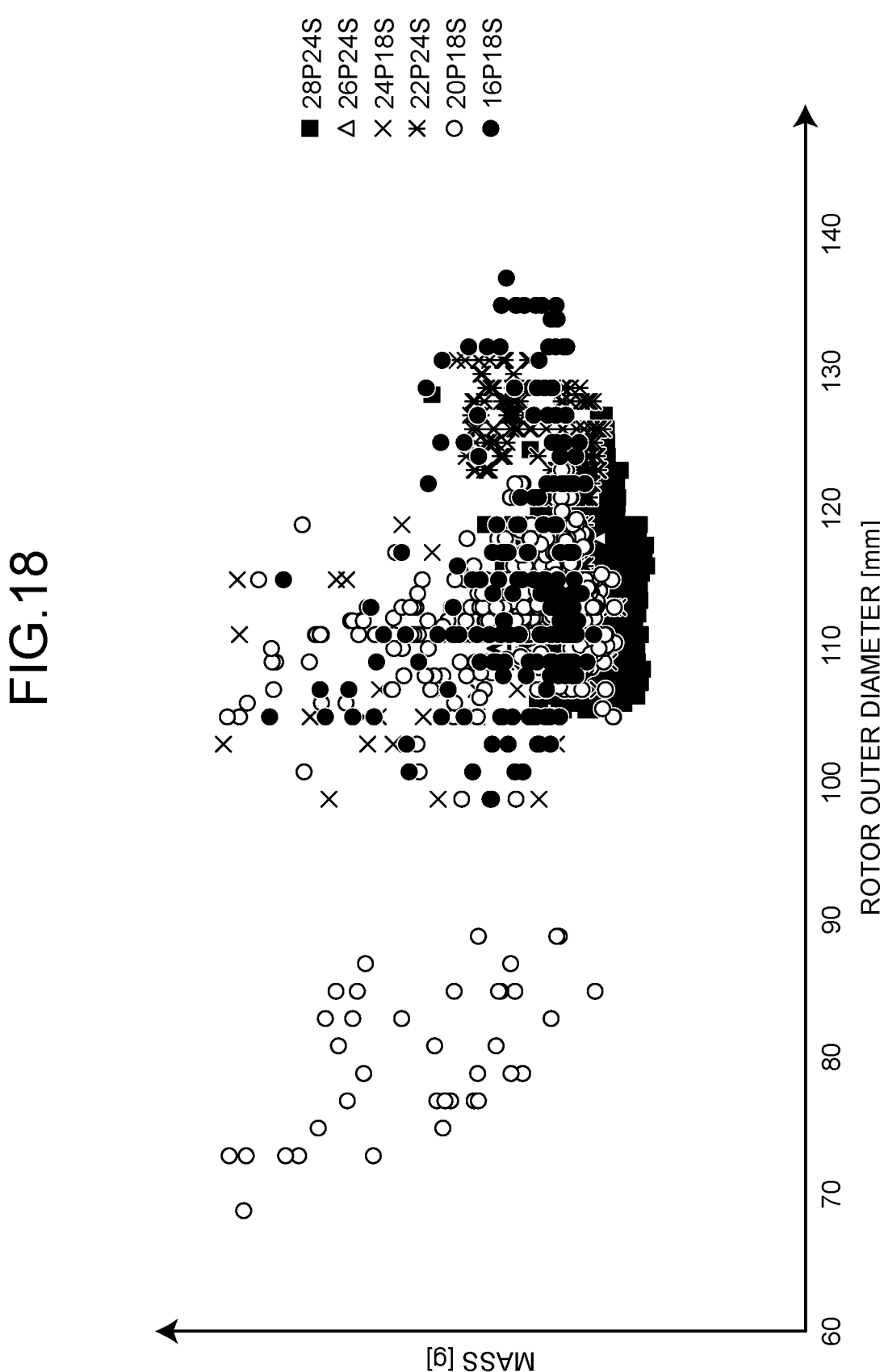
FIG. 18 is a drawing that shows the relationship between the rotor outer diameter and the motor mass of the motor for various pole count/slot count combinations according to the working example and the comparative examples.

FIG. 18 is a drawing that shows the relationship between the rotor outer diameter and the motor mass of motors with regard to various pole counts and slot counts according to the working example and the comparative examples. The motors according to the working example and the comparative examples in FIG. 18 are all outer-rotor types. The motor according to the working example is a 28-pole/24-slot (28P24S) motor. The motor according to Comparative Example 1 is a 26-pole/24-slot (26P24S) motor. The motor according to Comparative Example 2 is a 24-pole/18-slot (24P18S) motor. The motor according to Comparative Example 3 is a 22-pole/24-slot (22P24S) motor. The motor according to Comparative Example 4 is a 20-pole/18-slot (20P18S) motor. The motor according to Comparative Example 5 is a 16-pole/18-slot (16P18S) motor.

For each of the motors according to the working example and Comparative Examples 1 to 5, under the constraint wherein a stipulated (particular) motor torque was obtained, the dimensions of the regions described above (rotor outer diameter A, tooth width B, tooth-tip thickness C, magnet thickness D, yoke thickness E, aperture width F, and magnet-to-magnet distance G) were changed in accordance with the ranges described above, and the motor mass for each of those dimensions was calculated. FIG. 18 is a drawing in which the calculation results of the motor masses are plotted on a graph. In FIG. 18, the abscissa represents rotor outer diameter A and the ordinate represents the motor mass.

As shown in FIG. 18, to generate the stipulated (particular) motor torque, it was found that the motor mass according to the working example was smaller than the motor masses according to Comparative Examples 1 to 5. That is, it was found that, to generate the stipulated (particular) motor torque in an outer-rotor-type motor, the motor was lighter owing to the 28-pole/24-slot configuration. In addition, as shown in FIG. 18, with regard to the 28-pole/24-slot motor, it was found that, to make the motor mass small, it is preferable to set rotor outer diameter A to 105 mm or more and 125 mm or less, and more preferable to set rotor outer diameter A to 100 mm or more and 120 mm or less.

In addition, with regard to the 28-pole/24-slot motor, it was found that, to make the motor mass small, it is preferable to set tooth width B to 4 mm or more and 8 mm or less.

In addition, with regard to the 28-pole/24-slot motor, it was found that, to make the motor mass small, it is preferable to set magnet thickness D to 1.5 mm or more and 3.5 mm or less.

Figure 19:
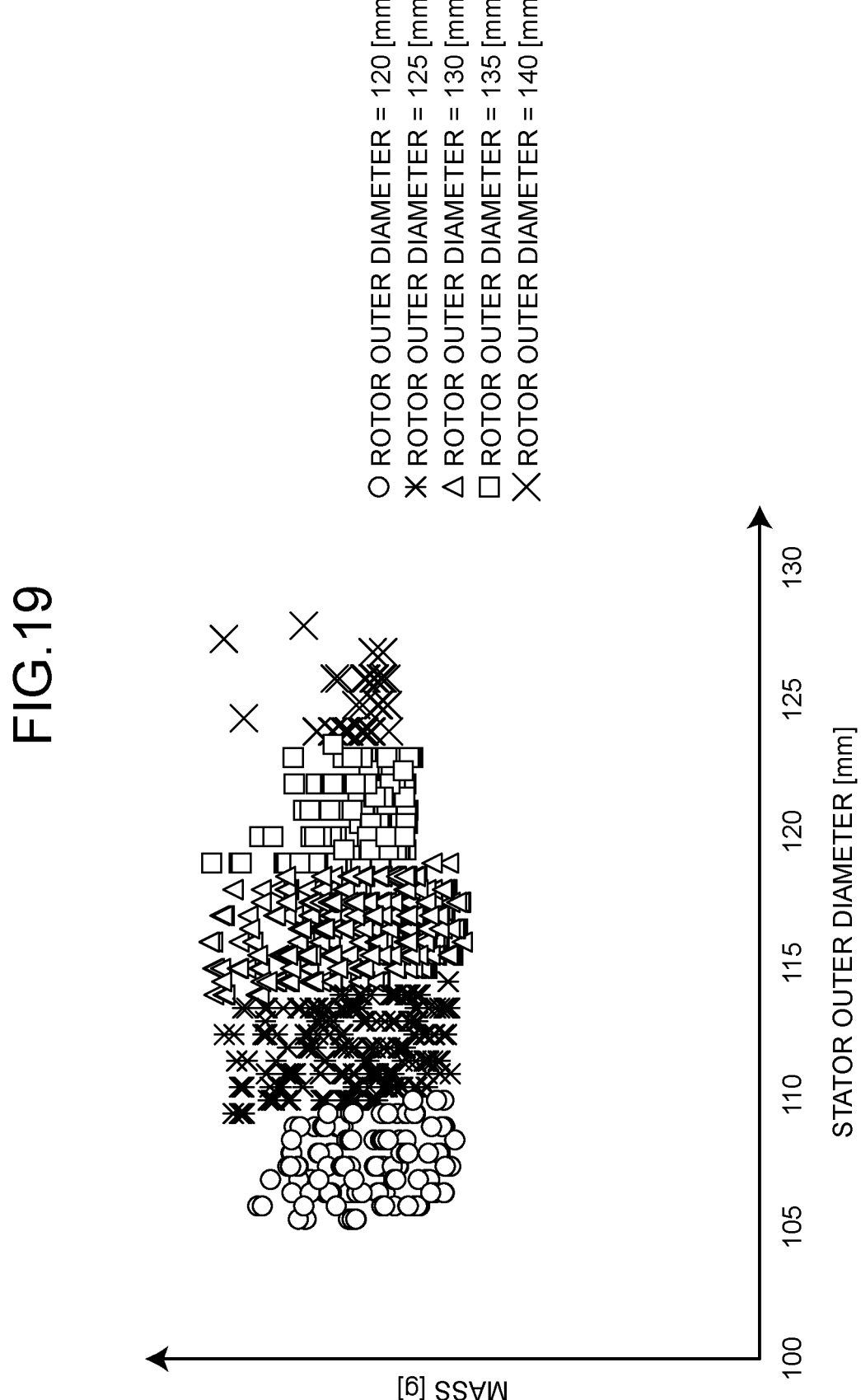
FIG. 19 is a graph that shows the relationship between the stator outer diameter and the motor mass of the motor for various rotor outer diameters according to the working example.

FIG. 19 is a drawing that shows the relationship between the stator outer diameter and the motor mass of the motor 4 for various rotor outer diameters according to the working example. The motors according to the working example in FIG. 19 were all 28-pole/24-slot outer-rotor type motors. Under the constraint wherein a stipulated (particular) motor torque was obtained, the dimensions of the regions described above (rotor outer diameter A, tooth width B, tooth-tip thickness C, magnet thickness D, yoke thickness E, aperture width F, and magnet-to-magnet distance G) were varied in accordance with the ranges described above, the stator outer diameters were also varied, and the motor mass for each of those dimensions was calculated.

As shown in FIG. 19, in embodiments in which rotor outer diameter A was varied by setting it to 120 mm, 125 mm, 130 mm, 135 mm, and 140 mm, the larger rotor outer diameter A became, the larger the stator outer diameter became, and the smaller rotor outer diameter A became, the smaller the stator outer diameter became.

In addition, with regard to the 28-pole/24-slot, outer-rotor-type motor, when the wire-to-wire resistance of the coils 33 is given as R [me] and the rated voltage of the battery pack 9 is given as V [V], it is preferable that the condition in Equation (2) below is satisfied.

$$R/V^2 \leq 0.038 \tag{2}$$

In the motor 4, which is a three-phase motor, wire-to-wire resistance R refers to the wire-to-wire resistance between the U and V phases, between the V and W phases, and between the W and U phases. In the embodiment, the wire-to-wire resistance R between the U and V phases, the wire-to-wire resistance R between the V and W phases, and the wire-to-wire resistance R between the W and U phases are all the same value.

As shown in FIG. 1, in an embodiment in which the electric work machine 1 is a lawn mower, to perform the necessary work, it is necessary to continuously input at least 720 Watts (W) of electric power to the motor 4. If 720 W (36V 20 A) of electric power is continuously input to the coils 33 of the motor 4, it was found based on experience that the wire-to-wire resistance (R) of the motor 4 at which the coils 33 do not burn out is 49 [me] or less. As described above, the battery pack 9 comprises lithium-ion batteries. The electric current that can be continuously discharged by one lithium-ion battery cell is approximately 15 A or more and 20 A or less. In addition, even in embodiments of the present teachings in which the electric work machine is other than a lawn mower, an important indicator is whether 720 W of electric power can be input continuously. Lithium-ion batteries feature various voltage bands; 720 W can be input to the motor 4 in various modes such as 18V 40 A, 36V 20 A, and 72V 10 A. Because the resistance value is proportional to the square of the voltage, the wire-to-wire resistance (R) of the motor 4 at which burnout does not occur when 720 W is input—regardless of the voltage—can be standardized (normalized) by defining the numerical value indicated by [R/V²]. In the embodiment, it was found that, when the design of the motor 4 was optimized at 0.038 [mΩ/V²] as the objective, the 28-pole/24-slot motor excelled the most for avoiding burnout of the coils 33.

Results

As explained above, in the detailed embodiment described above, the electric work machine 1 comprises: the motor 4, which comprises the rotor 10 and the stator 30 and is a brushless motor; the magnetic sensors 51; the controller 100; and the cutting blade 5, which is the output part driven by the rotor 10. The rotor 10 comprises the rotor core 12 and the permanent magnets 13, which are fixed to the rotor core 12. The stator 30 comprises: the stator core 31; the insulator 32, which is fixed to the stator core 31; and the coils 33, which are mounted on the insulator 32. The magnetic sensors 51 detect the position of the rotor 10 in the rotational direction by detecting the magnetic fluxes of the permanent magnets 13 while the rotor 10 is rotating (and thus the permanent magnets 13 are rotating). The controller 100 controls the energization of the coils 33 in accordance with (based in part on) the detection signals of the magnetic sensors 51. The permanent magnets 13 are neodymium, sintered, plate magnets. When the pole count, which denotes the number of permanent magnets 13, is given as N, and the stator diameter, which denotes the diameter of the stator core at the surface of the stator core 31 that faces the rotor 10, is given as x [mm], the condition below is satisfied.

$$0.16x+2.5<N<0.23x+3.6$$

With regard to the above-mentioned configuration, by satisfying the condition of [0.16x+2.5<N], the motor 4 can be made more lightweight and compact. By satisfying the condition of [N<0.23x+3.6], a decrease in the detection accuracy of the magnetic sensors 51 can be avoided.

In the embodiment, the electric work machine 1 comprises the battery-mounting part 8. The battery pack 9, which outputs the electric power supplied to the coils 33, is mounted on the battery-mounting part 8. The motor 4 is a three-phase motor. When the wire-to-wire resistance of the coils 33 is given as R [me] and the rated voltage of the battery pack 9 is given as V [V], the condition below is satisfied.

$$R/V^2 \leq 0.038$$

With regard to the above-mentioned configuration, even if the electric power is continuously input to the motor 4, the likelihood of burnout of the coils 33 can be reduced. Accordingly, the electric work machine 1 can durably exhibit the desired performance.

In the embodiment, the electric work machine 1 comprises: the motor 4, which comprises the rotor 10 and the stator 30 and is a brushless motor; and the cutting blade 5, which is the output part driven by the rotor 10. The rotor 10 comprises the rotor core 12 and the permanent magnets 13, which are fixed to the rotor core 12. The stator 30 comprises: the stator core 31; the insulator 32, which is fixed to the stator core 31; and the coils 33, which are mounted on the insulator 32. The pole count, which denotes the number of permanent magnets 13, is 28. The slot count, which denotes the number of coils 33, is 24.

With regard to the above-mentioned configuration, because the pole count is 28 and the slot count is 24, the magnetic fluxes generated by the coils 33 are dispersed, and thereby the permanent magnets 13 can be made compact and thin. Thereby, the motor 4 can be made more lightweight and compact.

In the embodiment, the motor 4 is an outer-rotor type.

With regard to the above-mentioned configuration, high motor torque is obtained.

In the embodiment, the motor 4 is an outer-rotor type motor, and rotor outer diameter A is 105 mm or more and 125 mm or less. Preferably, rotor outer diameter A is 110 mm or more and 120 mm or less.

With regard to the above-mentioned configuration, the motor 4 can be made more lightweight and compact.

In the embodiment, the stator core 31 comprises the teeth 31B, around which the coils 33 are respectively wound with the insulator 32 interposed therebetween. Tooth width B is 4 mm or more and 8 mm or less.

With regard to the above-mentioned configuration, the motor 4 can be made more lightweight and compact.

In the embodiment, magnet thickness D, i.e. the thickness of each of the permanent magnets 13, is 1.5 mm or more and 3.5 mm or less.

With regard to the above-mentioned configuration, the motor 4 can be made more lightweight and compact.

In the embodiment, the permanent magnets 13 are fixed to the inner-circumferential surface of the rotor core 12.

With regard to the above-mentioned configuration, the motor 4 can be made more compact.

In the embodiment, the permanent magnets 13 are fixed to the rotor core 12 by the bonding agent.

With regard to the above-mentioned configuration, the permanent magnets 13 are fixed to the rotor core 12 using a simple composition.

In the embodiment, the electric work machine 1 comprises the rotor shaft 20, which is fixed to the rotor 10. The cutting blade 5, which is the output part, is fixed to the rotor shaft 20.

With regard to the above-mentioned configuration, the cutting blade 5, which is the output part, is driven by the motor 4 in a direct-drive mode.

Other Embodiments—Modifications

In the embodiment described above, the motor 4 is an outer-rotor type motor. The motor 4 may instead be an inner-rotor type motor.

In the embodiment described above, the electric work machine 1 is a lawn mower, which is one type of gardening tool (outdoor power equipment). Gardening tools (outdoor power equipment) according to the present teachings are not limited to a lawn mower. Illustrative examples of gardening tools include a hedge trimmer, a chain saw, a mowing machine, and a blower. In addition, the electric work machine 1 may be a power tool. Illustrative examples of power tools include a driver-drill, a hammer driver-drill, an angle drill, an impact driver, a grinder, a hammer, a hammer drill, a circular saw, and a reciprocating saw.

In the embodiment described above, a single battery pack, which is mounted on the battery-mounting part, is the electrical power supply of the electric work machine. However, two or more battery packs may be respectively mounted on two or more battery-mounting parts and the combined electric power of the two or more battery packs may serve as the electrical power supply of the electric work machine. In the alternative, a commercial power supply (AC power supply) may be used as the electrical power supply of the electric work machine.

In the embodiment described above, a single insulator 32 was utilized to electrically isolate that teeth 31B from the coils 33. However, the single insulator 32 may instead be embodied as a plurality of discrete (separate) insulators.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved electric work machines, such as outdoor power equipment and power tools that utilize an electric motor as its drive source.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Electric work machine
2 Housing
3 Wheel
4 Motor
5 Cutting blade
6 Grass-catcher box
7 Handle
8 Battery-mounting part
9 Battery pack
10 Rotor
11 Rotor cup
11A Plate part
11B Yoke part
11C Opening
11F Recessed part
12 Rotor core
12E Ring part
12F Inward protruding part
12G Outward protruding part
13 Permanent magnet
14 Bushing
15 Discharge port
19 Bonding-agent layer
20 Rotor shaft
21 Bearing
22 Wave washer
23 Bearing
30 Stator
31 Stator core
31A Yoke
31B Tooth
31C Core-screw opening
32 Insulator
32C Outer-circumferential covering part
32D Tooth-covering part
33 Coil
40 Stator base
41 Plate part
42 Circumferential-wall part
43 Pipe part
43A Small-diameter part
43B Large-diameter part
43C Base-support surface
44 Screw boss
44A Base-screw hole
45 Circular-ring plate part
46 Screw boss
47 Opening
48 Cushioning member
50 Sensor board
51 Magnetic sensor
51U Magnetic sensor
51V Magnetic sensor
51W Magnetic sensor
60 Motor housing
61 Plate part
62 Circumferential-wall part 63 Flange part
64 Pipe part
65 Circular-ring plate part
66 Through hole
67 Screw
68 Ventilation path
70 Motor-positioning mechanism
71 Base, flat-surface area
72 Base, curved-surface area
73 Stator, flat-surface area
74 Stator, curved-surface area
75 Screw
90 Wire
91 Power-supply line
91U Power-supply line
91V Power-supply line
91W Power-supply line
92 Fusing terminal
92U Fusing terminal
92V Fusing terminal
92W Fusing terminal
100 Controller
101 Gate circuit
102 Inverter
103 Current-detection circuit
200 Deck
201 Through hole
202 Screw
203 Baffle
203A Opening
204 Through hole
205 Screw
600 Screw boss
601 Screw hole
602 Screw boss
603 Screw hole
AX Rotational axis

I claim:

1. An electric work machine comprising:
a brushless motor including: a rotor having permanent magnets fixed to a rotor core; a stator core; one or more insulators fixed to the stator core; and a stator having coils mounted on the insulator(s);
magnetic sensors configured to detect the position of the rotor in a rotational direction by detecting the magnetic flux of the permanent magnets;
a controller configured to control energization of the coils based at least in part on detection signals output by the magnetic sensors;
an output part configured to be driven by the rotor;
at least one battery-mounting part; and
at least one battery pack mounted on the at least one battery-mounting part and configured to supply electric power to generate drive currents that are supplied to the coils;
wherein:
the permanent magnets are each a neodymium, sintered, plate magnet;
a pole count (N) is defined as the number of permanent magnets;
a stator diameter (x) is defined as the diameter of a surface of the stator core that faces the rotor in millimeters;
the following condition is satisfied:

$$0.16x+2.5<N<0.23x+3.6;$$

the brushless motor is a three-phase motor;
a wire-to-wire resistance of the coils is R (mΩ);

a rated voltage of the at least one battery packs is V; and the following condition is satisfied:

$$R/V^2 \leq 0.038.$$

2. The electric work machine according to claim 1, wherein the brushless motor is an outer rotor brushless motor in which the rotor radially surrounds an outer circumference of the stator core.

3. The electric work machine according to claim 2, wherein the rotor has an outer diameter in a range of 105-125 mm.

4. The electric work machine according to claim 2, wherein the outer diameter of the rotor is 110-120 mm.

5. The electric work machine according to claim 2, wherein:
the stator core comprises teeth, around which the coils are respectively wound with the insulator(s) interposed therebetween; and
each of the teeth has a width of 4-8 mm.

6. The electric work machine according to claim 5, wherein the permanent magnets each have a thickness of 1.5-3.5 mm and are fixed to an inner-circumferential surface of the rotor core by a bonding agent.

7. The electric work machine according to claim 6, further comprising:
a rotor shaft fixed to the rotor;
wherein the output part is fixed to the rotor shaft.

8. The electric work machine according to claim 7, wherein the output part is a lawnmower cutting blade.

9. The electric work machine according to claim 1, wherein:
the stator core comprises teeth, around which the coils are respectively wound with the insulator(s) interposed therebetween; and
each of the teeth has a width of 4-8 mm.

10. The electric work machine according to claim 1, wherein the permanent magnets each have a thickness of 1.5-3.5 mm.

11. The electric work machine according to claim 1, further comprising:
a rotor shaft fixed to the rotor;
wherein the output part is fixed to the rotor shaft.

12. The electric work machine according to claim 1, wherein:
twenty-eight permanent magnets are fixed to the rotor core; and
twenty-four coils are mounted on the insulator(s).

13. The electric work machine according to claim 12, wherein:
the stator core comprises teeth, around which the coils are respectively wound with the insulator(s) interposed therebetween; and
each of the teeth has a width of 4-8 mm.

14. The electric work machine according to claim 12, wherein the permanent magnets each have a thickness of 1.5-3.5 mm and are fixed to an inner-circumferential surface of the rotor core by a bonding agent.

15. The electric work machine according to claim 12, further comprising:
a rotor shaft fixed to the rotor;
wherein the output part is fixed to the rotor shaft.

16. The electric work machine according to claim 12, wherein:
the stator core comprises teeth, around which the coils are respectively wound with the insulator(s) interposed therebetween;

each of the teeth has a width of 4-8 mm; and the permanent magnets each have a thickness of 1.5-3.5 mm and are fixed to an inner-circumferential surface of the rotor core by a bonding agent.

17. The electric work machine according to claim 16, further comprising:

a rotor shaft fixed to the rotor;

wherein the output part is a lawnmower blade that is directly fixed to the rotor shaft.

18. The electric work machine according to claim 17, wherein:

the rotor further includes a rotor cup that supports the rotor core; and discharge ports penetrate through the rotor cup.

19. The electric work machine according to claim 12, wherein:

the brushless motor is an outer-rotor brushless motor in which the rotor is disposed around an outer circumference of the stator core; and the rotor has an outer diameter in a range of 105-125 mm.

20. The electric work machine according to claim 19, wherein the outer diameter of the rotor is in a range of 110-120 mm.

\* \* \* \* \*